United States Patent
Endo et al.

(10) Patent No.: US 8,808,584 B2
(45) Date of Patent: Aug. 19, 2014

(54) ACTIVE MATERIAL FOR LITHIUM SECONDARY BATTERY, ELECTRODE FOR LITHIUM SECONDARY BATTERY, LITHIUM SECONDARY BATTERY, AND METHOD FOR PRODUCING THE SAME

(75) Inventors: Daisuke Endo, Kyoto (JP); Yoshihiro Katayama, Kyoto (JP); Toshiyuki Nukuda, Kyoto (JP)

(73) Assignee: GS Yuasa International Ltd., Kyoto-shi (JP)

(*) Notice: Subject to any disclaimer, the term of this patent is extended or adjusted under 35 U.S.C. 154(b) by 302 days.

(21) Appl. No.: 13/390,918

(22) PCT Filed: Aug. 20, 2010

(86) PCT No.: PCT/JP2010/064063
§ 371 (c)(1),
(2), (4) Date: Feb. 16, 2012

(87) PCT Pub. No.: WO2011/021686
PCT Pub. Date: Feb. 24, 2011

(65) Prior Publication Data
US 2012/0145954 A1  Jun. 14, 2012

(30) Foreign Application Priority Data

Aug. 21, 2009  (JP) .................. 2009-192208
Dec. 29, 2009  (JP) .................. 2009-299100

(51) Int. Cl.
| | | |
|---|---|---|
| H01B 1/08 | (2006.01) | |
| H01M 4/525 | (2010.01) | |
| C01G 53/00 | (2006.01) | |
| H01M 4/505 | (2010.01) | |
| H01M 10/058 | (2010.01) | |
| H01M 10/44 | (2006.01) | |
| H01M 4/131 | (2010.01) | |
| C01G 45/12 | (2006.01) | |
| H01M 10/0525 | (2010.01) | |
| C01G 51/00 | (2006.01) | |
| H01M 4/133 | (2010.01) | |
| H01M 4/134 | (2010.01) | |

(52) U.S. Cl.
CPC ....... *H01M 10/0525* (2013.01); *C01P 2002/52* (2013.01); *H01M 10/44* (2013.01); *H01M 4/505* (2013.01); *C01P 2002/54* (2013.01); *C01P 2002/60* (2013.01); *C01G 53/50* (2013.01); *Y02T 10/7011* (2013.01); *H01M 4/131* (2013.01); *C01P 2002/74* (2013.01); *C01P 2006/40* (2013.01); *H01M 4/133* (2013.01); *C01G 45/1228* (2013.01); *C01G 51/50* (2013.01); *H01M 4/525* (2013.01); *C01P 2006/88* (2013.01); *H01M 4/134* (2013.01); *C01P 2002/76* (2013.01); *Y02E 60/122* (2013.01)
USPC .................. 252/521.2; 429/231.95

(58) Field of Classification Search
CPC ........... H01B 1/08; H01M 4/48; C01G 51/50; C01G 53/50
USPC .......................... 252/521.2; 429/223, 231.95
See application file for complete search history.

(56) References Cited

U.S. PATENT DOCUMENTS

| | | | |
|---|---|---|---|
| 6,773,852 B2* | 8/2004 | Cho et al. ............... | 429/231.3 |
| 8,227,113 B2 | 7/2012 | Shimizu et al. | |
| 8,382,860 B2 | 2/2013 | Endo et al. | |

FOREIGN PATENT DOCUMENTS

| | | |
|---|---|---|
| CN | 101017914 A | 8/2007 |
| EP | 1372202 A1 | 12/2003 |
| JP | 2003-31219 | 4/2007 |
| JP | 2010-30808 | 2/2010 |
| WO | WO02/073718 | 9/2002 |
| WO | 2009/063838 A1 | 5/2009 |

OTHER PUBLICATIONS

Liao et al "Structural and thermal properties of LiNi0.6-xMgxCo0.25Mn0.15O2 cathode materials", Journal of Power Sources 183 (2008) 766-770.*

* cited by examiner

*Primary Examiner* — Mark Kopec
(74) *Attorney, Agent, or Firm* — Manabu Kanesaka

(57) ABSTRACT

It is an object of the present invention to provide an active material for a lithium secondary battery having high discharge capacity and excellent in high rate discharge characteristics and a lithium secondary battery using the same. The active material for a lithium secondary battery containing a solid solution of a lithium-transition metal composite oxide having an α-NaFeO$_2$ type crystal structure and the lithium secondary battery using the same have features that the composition ratios of the metal elements contained in the solid solution satisfy $Li_{1+(x/3)}Co_{1-x-y-z}Ni_{y/2}Mg_{z/2}Mn_{(2x/3)+(y/2)+(z/2)}$ (x>0; y>0; z>0; x+y+z<1); the active material has an X-ray diffraction pattern capable of belonging to space group $P3_112$; and the active material has discharge capacity exceeding 200 mAh/g. Further, in addition to the above-mentioned features, they have features that an intensity ratio between the diffraction peak of (003) plane and the diffraction peak of (114) plane measured by X-ray diffractometry is $I_{(003)}/I_{(114)} \geq 1.15$ and/or the half width of the diffraction peak of (003) plane is 0.15° or less and the half width of the diffraction peak of (114) plane is 0.25° or less.

20 Claims, No Drawings

ACTIVE MATERIAL FOR LITHIUM SECONDARY BATTERY, ELECTRODE FOR LITHIUM SECONDARY BATTERY, LITHIUM SECONDARY BATTERY, AND METHOD FOR PRODUCING THE SAME

RELATED APPLICATIONS

The present application is National Phase of International Application No. PCT/JP2010/064063 filed Aug. 20, 2010, and claims priorities from Japanese Application No. 2009-192208 filed Aug. 21, 2009, and Japanese Application No. 2009-299100 filed Dec. 29, 2009.

TECHNICAL FIELD

The present invention relates to an active material for a lithium secondary battery, a lithium secondary battery using the same, and a method for producing the same.

BACKGROUND ART

Conventionally, for a lithium secondary battery, $LiCoO_2$ is mainly used as a positive active material. However, the discharge capacity is about 120 to 130 mAh/g.

Materials obtained by forming solid solutions of $LiCoO_2$ with other compounds are known. A solid solution, $Li[Co_{1-2x}Ni_xMn_x]O_2$ ($0 < x \leq 1/2$), having an $\alpha$-$NaFeO_2$ type crystal structure and including three components, $LiCoO_2$, $LiNiO_2$, and $LiMnO_2$, was disclosed in 2001. A lithium secondary battery using one example of the above-mentioned solid solutions, $LiNi_{1/2}Mn_{1/2}O_2$ or $LiCo_{1/3}Ni_{1/3}Mn_{1/3}O_2$, as an active material has a discharge capacity of 150 to 180 mAh/g and is thus more excellent than that using $LiCoO_2$.

Non-Patent Documents 1 to 4 have proposed a solid solution having an $\alpha$-$NaFeO_2$ type crystal structure and including three components, $Li[Li_{1/3}Mn_{2/3}]O_2$, $LiNi_{1/2}Mn_{1/2}O_2$ and $LiCoO_2$. The material is expressed as $Li[Li, Mn, Ni, Co]O_2$. That is, this material is a $LiCoO_2$ material having an $\alpha$-$NaFeO_2$ type crystal structure and including a transition metal and Li in the site where Co exists. Therefore, it is expected that the discharge capacity is further increased. Non-Patent Documents 1 to 4 report that the discharge capacity becomes about 180 to 200 mAh/g.

However, an active material for a lithium secondary battery with furthermore improved discharge capacity has been desired.

Many trials of substitution a part of the transition metal site of a transition metal compound to be used for a positive active material for a lithium secondary battery with a different kind of element have been investigated, including, no need to say, an example of other active materials such as $LiMn_2O_4$ with a tetragonal spinel structure. However, the effect of the substitution with a different kind of element differs depending on each active material. Therefore, in this technical field, whether the effect caused in the case of one different material can be also caused in the case of another material is very difficult to expect and that is beyond discussion.

Non-Patent Document 5 discloses that as a result of substitution of a part of Co of $LiCoO_2$ with Mg, although the electron conductivity at room temperature is improved (see FIG. 2), but the discharge capacity is lowered by Mg addition (see FIG. 6 and FIG. 8).

Non-Patent Document 6 discloses a result of substitution of a part of a transition metal site of $LiCo_{1/3}Ni_{1/3}Mn_{1/3}O_2$, which is equivalent to a solid solution including three components, $LiCoO_2$, $LiNiO_2$, and $LiMnO_2$, with Mg. Owing to the substitution, similarly, the discharge capacity is lowered (see FIG. 8).

Non-Patent Document 7 discloses a result of substitution of a part of a transition metal site of $Li[Li_{0.15}Ni_{0.275}Mn_{0.575}]O_2$, which is equivalent to a solid solution including two components, $Li[Li_{1/3}Mn_{2/3}]O_2$ and $LiNi_{1/2}Mn_{1/2}O_2$, with Mg. Owing to the substitution, the capacity retention ratio along with repeated charge-discharge is improved. However, the initial discharge capacity is similarly lowered (see FIG. 2). Further, the reported discharge capacity does not exceed 200 mAh/g (see the same drawing).

Further, the invention disclosed in claim 6 of Patent Document 1 is "a positive active material comprising a composite oxide, as a main component, represented by $Li[Mn_cNi_dCo_e-Li_aM''_b]O_2$ (M'' is at least one element selected from the group consisting of B, Mg, Al, Ti, V, Cr, Fe, Cu, and Zn; $d \leq c+e+a+b$; $c+d+e+a+b=1$; $0 \leq a \leq 0.05$; $0 \leq b \leq 0.05$; $0.2 \leq c \leq 0.5$; $0.02 \leq e \leq 0.4$), wherein the positive active material has a specific surface area of 0.3 $m^2$/g or more and 1.5 $m^2$/g or less, an X-ray diffraction pattern capable of belonging to space group R3/m, a relative intensity ratio of the diffraction peak at $2\theta=44.1\pm1°$ to the diffraction peak at $2\theta=18.6\pm1°$ of 0.6 or more and 1.1 or less, the half width of the diffraction peak at $2\theta=18.6\pm1°$ of 0.13° or more and 0.20° or less, the half width of the diffraction peak at $2\theta=44.1\pm1°$ of 0.10° or more and 0.17° or less, and a particle diameter of 3 nm or more and 20 nm or less". In this document, it is also described that a nonaqueous electrolyte secondary battery provided with both satisfactory high rate discharge performance and satisfactory charge-discharge cycle performance can be obtained by using a positive active material with the relative intensity ratio adjusted to 0.6 or more and 1.1 or less. However, it is not described that in the case where the relative intensity ratio of an active material having a specified composition in which Mg is employed for M'' is within a specific range, the discharge capacity is significantly improved and that in the case where the half width of the active material having a specified composition in which Mg is employed for M'' is within a specified range, the high rate discharge characteristics are significantly improved.

The invention disclosed in claim 1 of Patent Document 2 is "a positive active material comprising a composite oxide represented by the composition formula $Li_aMn_{0.5-x}Ni_{0.5-y}M_{x+y}O_2$ ($0<a<1.3$; $-0.1 \leq x-y \leq 0.1$; M is an element other than Li, Mn, and Ni)". Further, from the 7th line from the bottom of page 6 to the 4th line of page 7 in this document, it is described that "the positive active material according to 2 has a feature of containing a composite oxide in which M is at least one element selected from the group consisting of Al, Mg, and Co and the coefficients in the composition formula satisfy the following relational expressions, $0.05 \leq x<0.3$; $0.05 \leq y<0.3$; $-0.1 \leq x-y \leq 0.02$; $0<a<1.3$; and $x+y<0.5$. Owing to such a configuration, it is made possible to particularly form a positive active material which can provide a nonaqueous electrolyte secondary battery excellent in high rate discharge performance and charge-discharge cycle performance and having a high energy density". Further, from the 4th line from the bottom of page 8 to the 3rd line of page 9 in this document, it is described that "the positive active material according to 5 has a feature that the composite oxide . . . has the following total fine pore volume and that the relative intensity ratio of the diffraction peak at $2\theta=44.1\pm1°$ to the diffraction peak at $2\theta=18.6\pm1°$ in the powder X-ray diffraction diagram using $CuK\alpha$-ray is 0.65 or more and 1.05 or less. Owing to such a configuration, it is made possible to particularly form a positive active material which can provide a nonaqueous electrolyte secondary battery excellent in high rate discharge performance and charge-discharge cycle performance and having a high energy density (high discharge capacity)". Furthermore, from the 4th line to the 10th line of page 9 in this document, it is described that "the positive active material according to 6 has a feature that the composite oxide . . . has the following specific surface area and that the relative intensity ratio of the diffraction peak at 2θ=44.1±1° to the diffraction peak at 2θ=18.6±1° in the powder X-ray diffraction diagram using CuKα-ray is 0.65 or more and 1.05 or less. Owing to such a configuration, it is made possible to particularly form a positive active material which can provide a nonaqueous electrolyte secondary battery excellent in high rate discharge performance and charge-discharge cycle performance and having a high energy density (high discharge capacity)". However, it is not described that in the case where the relative intensity ratio of an active material having a specified composition in which Mg is employed for M is within a specified range, the discharge capacity is improved significantly".

Also, from the 11th line to 16th line of page 9 of Patent Document 2, it is described that "the positive active material according to 7 has a feature that the half width of the diffraction peak at 2θ=18.6±1° is 0.05° or more and 0.20° or less and the half width of the diffraction peak at 2θ=44.1±1° is 0.10° or more and 0.20° or less. Owing to such a configuration, it is made possible to particularly form a positive active material which can provide a nonaqueous electrolyte secondary battery having a high energy density (high discharge capacity) and excellent in charge-discharge cycle performance". However, it is not described in this document that in the case where the half width of the diffraction peak of an active material having a specified composition in which Mg is employed for M is within a specified range, the high rate discharge characteristics are improved significantly".

The invention disclosed in claim 1 of Patent Document 3 is "an active material for a lithium secondary battery comprising a solid solution of a lithium-transition metal composite oxide having an α-NaFeO$_2$ type crystal structure, wherein the composition ratios of Li, Co, Ni, and Mn contained in the solid solution satisfy Li$_{1+1/3x}$Co$_{1-x-y}$Ni$_{y/2}$Mn$_{2x/3+y/2}$ (x+y≤1; 0≤y; 1-x-y=z) and in a ternary phase diagram of Li[Li$_{1/3}$Mn$_{2/3}$]O$_2$ (x)-LiNi$_{1/2}$Mn$_{1/2}$O$_2$ (y)-LiCoO$_2$ (z), (x, y, z) is represented by values existing on lines of or within a heptagon ABCDEFG defined by vertexes; point A (0.45, 0.55, 0), point B (0.63, 0.37, 0), point C (0.7, 0.25, 0.05), point D (0.67, 0.18, 0.15), point E (0.75, 0, 0.25), point F (0.55, 0, 0.45), and point (0.45, 0.2, 0.35) and the intensity ratio between the diffraction peak of (003) plane and the diffraction peak of (104) plane measured by X-ray diffractometry is I$_{(003)}$/I$_{(104)}$≥1.56 before charge-discharge and I$_{(003)}$/I$_{(104)}$>1 at the end of discharge". Further, the invention disclosed in claim 10 of Patent Document 3 is "a method for producing the lithium secondary battery according to claim 9 employing a charging method where the positive electrode upon charge has a maximum reaching potential of 4.3 V (vs. Li/Li$^+$) or less, the method comprising the step of charging in such a manner that the charge attains at least a region appearing in a positive electrode potential range exceeding 4.3 V (vs. Li/Li$^+$) and 4.8 V (vs. Li/Li$^+$) or less and having a relatively plateau potential variation". Further, in the paragraph 68 of this document, it is described that "in a conventional active material, it is supposed that such disorder phase is formed to inhibit smooth transfer of Li ion and it affects the reversible capacity. On the other hand, in the active material of the present invention, it is supposed that since I$_{(003)}$/I$_{(104)}$≥1.56, formation of the disorder phase is extremely slight and thus an excellent discharge capacity can be obtained". Furthermore, as examples, it is disclosed an active material for a lithium secondary battery which has I$_{(003)}$/I$_{(104)}$=1.77 as an intensity ratio between the diffraction peak of (003) plane and the diffraction peak of (104) plane measured by X-ray diffractometry before charge-discharge and I$_{(003)}$/I$_{(104)}$=1.67 at the end of discharge and a discharge capacity of 225 mAh/g. However, this active material does not contain Mg. Accordingly, this document does not indicate that the discharge capacity is significantly improved in the case where the relative intensity ratio of an active material having a specified composition containing Mg is within a specified range.

Further, the lithium secondary battery using a solid solution as an active material disclosed in Patent Document 3 has a problem that it is impossible to obtain capacity at the time of high rate discharge as disclosed in comparative examples described below.

The invention disclosed in claim 1 of Patent Document 4 is "a lithium-nickel-manganese-cobalt composite oxide comprising a layer structure and the chemical composition, Li$_a$Ni$_x$ Mn$_y$Co$_z$O$_{2+b}$ (x+y+z=1, 1.00<a<1.3, 0≤b<0.3), wherein the diffraction peak angle 2θ of (003) plane and the diffraction peak angle 2θ of (104) plane are 18.65° or more and 44.50° or more, respectively, in Miller's index hkl of the powder X-ray diffraction using CuKα-ray, and both the half widths of the diffraction peaks of the planes are 0.18° or less and also the diffraction peak angle 2θ of (108) plane and the diffraction peak angle 2θ of (110) plane are 64.40° or more and 65.15° or more, respectively, and both the half widths of the diffraction peaks of the planes are 0.18° or less. Further, in the paragraph 17, it is described that "if the diffraction peak angle 2θ of (003) plane and the diffraction peak angle 2θ of (104) plane are lower than 18.65° and 44.50°, respectively, in Miller's index hkl of the powder X-ray diffraction using CuKα-ray, the phase interval is decreased and diffusion of lithium ions is inhibited. Therefore, the charge-discharge characteristics are deteriorated. Further, if the half width of the diffraction peak of each of the planes is higher than 0.18°, the crystal growth is insufficient or variation in the composition becomes significant. Therefore, the charge-discharge characteristics are deteriorated". However, the relation of the half width of the diffraction peak of (003) plane and the half width of the diffraction peak of (104) plane with the high rate discharge characteristics are not described.

The invention disclosed in claim 1 of Patent Document 5 is "a positive active material comprising lithium-containing metal composite oxide particles having a crystal structure belonging to space group R-3m, the half width of the X-ray diffraction peak corresponding to (104) plane in a range of 0.06 to 0.15° and an average value of the shape factor SF1 calculated according to the following expression (1) in a range of more than 1 and 3.3 or less.". Further, it is described that in the case where the crystal structure of the lithium-containing metal composite oxide particles belongs to space group R-3m and the half width of the X-ray diffraction peak corresponding to (104) plane is within a range of 0.06 to 0.15°, high discharge load characteristics (high rate discharge characteristics) can be obtained. Furthermore, in the paragraph 25 of this document, it is described that if the half width exceeds 0.15°, the crystallinity of the lithium-containing metal composite oxide is lowered and therefore, it becomes difficult to obtain high rate discharge characteristics. However, this document does not at all disclose the addition of Mg to the lithium-containing metal composite oxide. Moreover, it is not also suggested that the high rate discharge characteristics are significantly improved by specifying the range of the half width of the diffraction peak of the lithium-containing metal composite oxide containing Mg.

In the paragraph 77 of Patent Document 6, it is described that "it is made possible to provide an additional function by doping $LiNi_{1/3}Mn_{1/3}Co_{1/3}O_2$ of the present invention with a different kind of element and the addition of magnesium remarkably improves the electron conductivity". Further, in the paragraphs 28 to 30 of this document, it is also described that an oxide with an increased lithium atomic ratio and represented by $Li[Li_x(Ni_{1/3}Mn_{1/3}Co_{1/3})_{1-x}]O_2$ (wherein, $0 \leq x \leq 0.3$) can be used. A nickel-manganese-cobalt composite oxide obtained by mixing a composite oxide obtained by coprecipitation and lithium hydroxide in dry state and calcining the mixture at 1000° C. has a hexagonal system belonging to layer structure R3m. However, it is not suggested that if magnesium is added as a solid solution component to a nickel-manganese-cobalt composite oxide, the discharge capacity is significantly improved and the high rate discharge characteristics are remarkably improved.

The invention disclosed in claim 6 of Patent Document 7 is "a lithium-nickel-manganese-cobalt composite oxide powder for a positive material of a lithium secondary battery comprising a crystal structure belonging to a layer structure and the composition represented by the following formula:

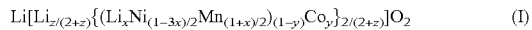

$$Li[Li_{z/(2+z)}\{(Li_xNi_{(1-3x)/2}Mn_{(1+x)/2})_{(1-y)}Co_y\}_{2/(2+z)}]O_2 \quad (I)$$

(wherein $0.01 \leq x \leq 0.15$; $0 \leq y \leq 0.35$ and $0.02(1-y)(1-3x) \leq z \leq 0.15(1-y)(1-3x))$". In the paragraphs 14 and 15 of this document, it is described that it is important that the Li amount is in a slightly richer range than that in the stoichiometric composition and that the battery performances (particularly rate characteristics and output characteristics) are increased due to that. However, it is not suggested that in the case where the lithium-nickel-manganese-cobalt composite oxide is a specified composition containing magnesium, the discharge capacity is significantly improved and the high rate discharge characteristics are remarkably improved.

Further, the positive active materials for a lithium secondary battery disclosed in Patent Documents 1 to 7 are not supposed to be a solid solution of four components including $Li[Li_{1/3}Mn_{2/3}]O_2$, $LiNi_{1/2}Mn_{1/2}O_2$, $LiCoO_2$ and $LiMg_{1/2}Mn_{1/2}O_2$. Therefore, even in the case where the above-mentioned positive active materials contain Mg and satisfy the condition of the relative intensity ratio, it cannot be expected that the discharge capacity is improved based on the descriptions of Non-Patent Documents 5 to 7.

PRIOR ART DOCUMENTS

Non-Patent Documents

Non-Patent Document 1: Electrochim. Acta, vol. 51, page 5581-5586, 2006.
Non-Patent Document 2: J. Power Sources, vol. 146, page 598-601, 2005.
Non-Patent Document 3: J. Electrochem. Soc., vol. 152, no. 1, page A171-A178, 2005.
Non-Patent Document 4: Mater. Lett., vol. 58, page 3197-3200, 2004.
Non-Patent Document 5: J. Electrochem. Soc., vol. 144, page 3164-3168, 1997.
Non-Patent Document 6: Solid State Ionics, vol. 178, page 849-857, 2007.
Non-Patent Document 7: J. Mater. Chem., vol 13, page 319-322, 2003.

PATENT DOCUMENTS

Patent Document 1: Japanese Patent No. 4320548
Patent Document 2: WO 2002/086993 A1
Patent Document 3: WO 2009/063838 A1
Patent Document 4: Japanese Patent No. 4216669
Patent Document 5: Japanese Patent Application No. 2003-178756
Patent Document 6: Japanese Patent Application No. 2003-17052
Patent Document 7: Japanese Patent Application No. 2006-253119

DISCLOSURE OF THE INVENTION

Problems to be Solved by the Invention

The present invention has been made in view of the above problems. It is an object of the present invention to provide an active material for a lithium secondary battery having high discharge capacity and excellent in high rate discharge characteristics and a lithium secondary battery using the active material.

Solutions to the Problems

The configuration and action effects of the present invention will be described with reference to the technical concept. However, the action mechanism include presumption and whether the presumption is correct or not is not intended to limit the present invention at all. The present invention can be carried out in various manners without departing from the spirit and main features of the invention. Accordingly, the present invention should not to be construed as being limited since the embodiments or experimental examples described below are only illustrations in any ways. All modifications and alterations belonging to the equivalent scope of the claims are within the present invention.

With respect to a material having an $\alpha$-$NaFeO_2$ type crystal structure and capable of being represented by $Li[Li, Mn, Ni, Co]O_2$, the valences of the respective metal elements existing in the transition metal site should be taken into consideration. That is, in the case of synthesizing a material represented by $Li[Li, Mn, Ni, Co]O_2$, the composition ratios of Li, Co, Ni, and Mn, the metal elements contained in raw materials, cannot be arbitrarily determined. The ratios of the respective metal elements are determined in such a manner that the valences of the respective metal elements existing in the transition metal site are to be $Li^{1+}$, $Mn^{4+}$, $Ni^{2+}$, and $Co^{3+}$. In the case where a material synthesized in the above-mentioned manner and having a half width of a diffraction peak in the X-ray diffraction pattern within a specified range is used as an active material for a lithium secondary battery, high discharge capacity can be obtained.

The condition in which the valences of the respective metal elements become $Li^{1+}$, $Mn^{4+}$, $Ni^{2+}$, and $Co^{3+}$ can be established by assuming a solid solution including three components; $Li[Li_{1/3}Mn_{2/3}]O_2$, $LiNi_{1/2}Mn_{1/2}O_2$, and $LiCoO_2$. That is, first, $xLi[Li_{1/3}Mn_{2/3}]O_2$-$yLiNi_{1/2}Mn_{1/2}O_2$-$(1-x-y)LiCoO_2$ (wherein, $x>0$; $y>0$; and $x+y<1$) is assumed and then, x and y are arbitrarily selected. Accordingly, the valences of the respective metal elements existing in the transition metal site of an $\alpha$-$NaFeO_2$ type crystal structure can be theoretically made to be $Li^{1+}$, $Mn^{4+}$, $Ni^{2+}$, and $Co^{3+}$.

The active material for a lithium secondary battery of the present invention has a feature of containing Mg. Also, in this case, the valences of the metal elements existing in the transition metal site should be taken into consideration. That is, the effects of the present invention can be significantly exerted by determining the ratios of the respective metal elements in the condition in which the valences of the respective metal elements existing in the transition metal site become $Li^{1+}$, $Co^{3+}$, $Ni^{2+}$, $Mn^{4+}$, and $Mg^{2+}$.

Herein, at the time of determining the Mg ratio while keeping the condition in which the valences become $Li^{1+}$, $Mn^{4+}$, $Ni^{2+}$, $Co^{3+}$, and $Mg^{2+}$, some methods of thinking can be employed. The first method of thinking is a method for determining the Mg ratio according to a concept that the $Ni^{2+}_{1/2}Mn^{4+}_{1/2}$ portion constituting the assumed $LiNi_{1/2}Mn_{1/2}O_2$ is substituted with $Mg^{2+}_{1/2}Mn^{4+}_{1/2}$. This method will be concretely described in detail as Examples 2-1 to 2-6 in the present specification. The second method of thinking is a method for determining the Mg ratio according to a concept that the $[Li_{1/3}Mn_{2/3}]^{3+}$ portion constituting the assumed $Li[Li_{1/3}Mn_{2/3}]O_2$ is substituted with $[Mg^{1/2}Mn_{1/2}]^{3+}$. This method will be concretely described in detail as Examples 2-7 to 2-10 in the present specification. The third method of thinking is a method for determining the Mg ratio according to a concept that $Co^{3+}$ is substituted with $[Mg_{1/2}Mn_{1/2}]^{3+}$. Methods employing two or three of these concepts in combination are also supposed to be possible.

In any case of employing the above-mentioned methods of thinking, the condition in which the valences of the respective metals become $Li^{1+}$, $Mn^{4+}$, $Ni^{2+}$, $Co^{3+}$, and $Mg^{2+}$ can be clearly obtained by assuming a solid solution including four components; $Li[Li_{1/3}Mn_{2/3}]O_2$, $LiNi_{1/2}Mn_{1/2}O_2$, $LiCoO_2$, and $LiMg_{1/2}Mn_{1/2}O_2$. That is, the valences of the respective metal elements existing in the transition metal site of an α-NaFeO$_2$ type crystal structure can theoretically be made to be $Li^{1+}$, $Co^{3+}$, $Ni^{2+}$, $Mn^{4+}$, and $Mg^{2+}$ by assuming a solid solution, $xLi[Li_{1/3}Mn_{2/3}]O_2\text{-}yLiNi_{1/2}Mn_{1/2}O_2\text{-}zLiMg_{1/2}Mn_{1/2}O_2\text{-}(1-x-y-z)LiCoO_2$ (x>0; y>0; z>0; x+y+z<1) and arbitrarily selecting x, y, and z.

If the above-mentioned formula $xLi[Li_{1/3}Mn_{2/3}]O_2\text{-}yLiNi_{1/2}Mn_{1/2}O_2\text{-}zLiMg_{1/2}Mn_{1/2}O_2\text{-}(1-x-y-z)LiCoO_2$ is changed, the formula $Li_{1+(x/3)}Co_{1-x-y-z}Ni_{y/2}Mg_{z/2}Mn_{(2x/3)+(y/2)+(z/2)}O_2$ is unambiguously obtained. Herein, the present invention provides an active material for a lithium secondary battery containing a solid solution of a lithium-transition metal composite oxide having an α-NaFeO$_2$ type crystal structure, wherein the composition ratios of the metal elements contained in the solid solution satisfy $Li_{1+(x/3)}Co_{1-x-y-z}Ni_{y/2}Mg_{z/2}Mn_{(2x/3)+(y/2)+(z/2)}$ (x>0; y>0; z>0; x+y+z<1) and the solid solution has an X-ray diffraction pattern capable of belonging to space group P3$_1$12 and has discharge capacity exceeding 200 mAh/g.

As described in comparative examples below, even in the case of an active material satisfying the above-mentioned composition ratios of the metal elements and having an X-ray diffraction pattern capable of belonging to space group P3$_1$12, the discharge capacity sometimes becomes 200 mAh/g or less. The present invention provides an active material limited to those having a discharge capacity exceeding 200 mAh/g in a charge-discharge cycle test described below among the above-mentioned active materials.

In order to make the active material having a discharge capacity exceeding 200 mAh/g, the calcining temperature notably affects. A solid solution of a lithium-transition metal composite oxide satisfying the above-mentioned composition ratios of the metal elements having a discharge capacity exceeding 200 mAh/g can be obtained by calcining at a temperature exceeding 900° C., for example, at a temperature of 920° C. or higher. If the calcining temperature exceeds 1000° C., an active material having an X-ray diffraction pattern capable of belonging to space group P3$_1$12 cannot be obtained in some cases. The calcining temperature is preferably 1000° C. or lower.

The present inventors have found for the first time that in the case where the above-mentioned solid solution of a lithium-transition metal composite oxide containing Mg is used as an active material having a high discharge capacity exceeding 200 mAh/g, the high rate discharge characteristics are also significantly improved.

The active material satisfying the above-mentioned composition ratios of the metal elements and having an X-ray diffraction pattern capable of belonging to space group P3$_1$12 can be an active material, from the viewpoint of characteristics, having a discharge capacity exceeding 200 mAh/g in the case where the intensity ratio between the diffraction peak of (003) plane and the diffraction peak of (114) plane measured by X-ray diffractometry is $I_{(003)}/I_{(114)} \geq 1.15$ and/or in the case where the half width of the diffraction peak of (003) plane is 0.15° or less and the half width of the diffraction peak of (114) plane is 0.25° or less.

In general, it is known the fact that if a lithium-transition metal composite oxide having an α-NaFeO$_2$ type crystal structure is synthesized through a calcining step and the element composition ratios are determined by chemical analysis of the actually obtained compound, the composition ratios are slightly fluctuated (by about 5%) from the composition ratios calculated from the composition ratios of raw materials to be loaded. The present invention can be carried out without departing from the technical concept and main features of the invention. Accordingly, there is no need to say that the material obtained by synthesis should not be construed not to fall within the scope of the present invention merely since the composition of the material is not strictly the same as the above-mentioned composition formula. Particularly, it is known with respect to the Li amount that lithium is easy to be volatilized in the calcining step. Further, with respect to the coefficient of oxygen atom, it is possible to be varied depending on synthesis conditions or the like, and it is not at all limited strictly to be 2. Therefore, it should not be construed that the material does not fall within the scope of the present invention merely because the material is oxygen-deficient. In the present invention, the coefficient of oxygen is not defined in the above-mentioned formula defining the composition ratios of the metal elements.

The active material of the present invention may contain an element other than Li, Co, Ni, Mn, Mg, and O. Also in the case where an element other than Li, Co, Ni, Mn, Mg, and O is contained, the active material of the present invention is required to satisfy the valence condition that the valences of Li, Co, Ni, Mn, and Mg among elements constituting the above-mentioned solid solution are respectively $Li^{1+}$, $Co^{3+}$, $Ni^{2+}$, $Mn^{4+}$ and $Mg^{2+}$. In addition, along with charge-discharge of a battery, the Li amount in the active material varies and the valences of the transition metals also vary. Even in a case of an active material sampled from a battery with unknown depth of charge-discharge, the ratios of metal elements including Li can be known at the time when the active material is synthesized by combining ICP emission spectrometry, X-ray diffractometry, oxygen amount analysis, and the like. Accordingly, whether the active material is within the scope of the invention or not can be determined.

Herein, a powder obtained merely by mixing a $LiCoO_2$ power, a $LiNi_{1/2}Mn_{1/2}O_2$ powder, a $Li[Li_{1/3}Mn_{2/3}]O_2$ powder, and the like is not contained in the "solid solution" of the present invention. Single substances of these materials have different peak positions corresponding to the respective lattice constants observed in the case of carrying out X-ray diffractometry. Therefore, if X-ray diffractometry is carried out for a simple mixture of these materials, diffraction pattern corresponding to the respective single substances can be obtained.

Herein, it is preferable that a value for x is selected in a range of $1/3<x<2/3$. Accordingly, in the case where a synthesized material is used as an active material for a lithium secondary battery, relatively high discharge capacity can be obtained. The values for x and y may be properly selected in consideration of what battery characteristics are required for a battery in which the active material is to be employed. The value for z relates to the Mg amount. As described in examples below, an effect to improve the discharge capacity can be significantly exerted merely by adding an extremely small amount of Mg to the active material as compared with the case where no Mg is added. Conversely, since the valence of Mg does not change even by carrying out charge-discharge, excess addition is not advantageous and it is preferable not to add an excess amount of Mg. The way of exerting the effect of the present invention in the case of variously changing the value for z differs depending on the values for x and y. Therefore, it is preferable to determine the values for x and y to be employed in accordance with the design of a battery, to change the value for z according to the above-mentioned technical concept and to employ a proper value for z. In order to improve the discharge capacity, it is preferable to satisfy $0<y<2/3$ and $0<z<0.3$.

As described above, "an active material for a lithium secondary battery containing a solid solution of a lithium-transition metal composite oxide having an $\alpha$-NaFeO$_2$ type crystal structure, wherein the composition ratios of the metal elements contained in the solid solution satisfy $Li_{1+(x/3)}Co_{1-x-y-z}Ni_{y/2}Mg_{z/2}Mn_{(2x/3)+(y/2)+(z/2)}$ ($x>0$; $y>0$; $z>0$; $x+y+z<1$)" can make it possible to exert high discharge capacity. In the present invention, in order to remarkably improve the discharge capacity and the high rate discharge characteristics, the above-mentioned solid solution of a lithium-transition metal composite oxide is made to have an X-ray diffraction pattern capable of belonging to space group $P3_112$. Further, in the present invention, the intensity ratio between the diffraction peak of (003) plane and the diffraction peak of (114) plane measured by X-ray diffractometry in this solid solution is adjusted to $I_{(003)}/I_{(114)} \geq 1.15$ and/or the half width of the diffraction peak of (003) plane is adjusted to 0.15° or less and the half width of the diffraction peak of (114) plane is adjusted to 0.25° or less.

The X-ray diffraction pattern of the solid solution of the present invention is capable of belonging to space group $P3_112$. However, it is not impossible that the diffraction pattern is made to belong to space group R3$^-$m. At this time, it is required that the diffraction peak of (114) plane in the case where it is made to belong to space group $P3_112$ is read as the "diffraction peak of (104) plane" in the case where it is made to belong to space group R3$^-$m. Herein, with respect to the notation of "R3$^-$m", it should be described rightfully as "3" with a superscript bar "$^-$"; however for convenience in this specification, it is described as "R3$^-$m".

In order to produce a lithium secondary battery using the active material for a lithium secondary battery of the present invention, wherein sufficient discharge capacity can be extracted even if a charging method is employed wherein the positive electrode upon charge has a maximum reaching potential of 4.3 V (vs. Li/Li$^+$) or less at the time of use, the following is important: the charging step in consideration of a characteristic behavior of the active material for a lithium secondary battery of the present invention is provided in the production process of the lithium secondary battery. That is, similarly to the active material for a lithium secondary battery described in Patent Document 3, if the active material for a lithium secondary battery containing Mg of the present invention is used for a positive electrode and subjected continuously to constant current charge, as described in examples below, a region with a relatively plateau potential variation is observed in a range of positive electrode potential from 4.3 V to 4.8 V over a relatively long time.

Herein, the present invention provides a method for producing the above-mentioned lithium secondary battery employing a charging method where the positive electrode upon charge has a maximum reaching potential of 4.3 V (vs. Li/Li$^+$) or less, the method including the step of charging in such a manner that the charge attains at least a region appearing in a positive electrode potential range exceeding 4.3 V (vs. Li/Li$^+$) and 4.8 V (vs. Li/Li$^+$) or less and having a relatively plateau potential behavior.

Herein, it is required that the charge in the initial charge-discharge step before completion of a battery attains at least the potential plateau region. Since the potential plateau region continues relatively long (for example 100 mAh/g or more), it is preferable that the charge continues so as to be through the process as much as possible. Further, in the case where the terminal of the potential plateau region is observed in accordance with a potential increase or the like, it may be employed as a charge termination condition. Alternatively, constant current and constant voltage charge may be employed and the charge termination condition may be determined by a manner that the current value is decreased to a set value.

Effects of the Invention

According to the present invention, an active material for a lithium secondary battery having high discharge capacity and excellent in high rate discharge characteristics can be obtained.

MODE FOR CARRYING OUT THE INVENTION

A method for producing the active material for a lithium secondary battery of the present invention will be described.

The active material for a lithium secondary battery of the present invention can be basically obtained by preparing raw materials containing metal elements (Li, Mn, Co, Ni, and Mg) constituting the active material as the composition which is the same as that of the active material (oxide) to be intended and calcining the raw materials. However, with respect to the amount of a Li raw material, it is preferable to load the material exceeding by about 1 to 5% in expectation of loss of a part of the Li raw material during calcining.

As a method for producing an oxide having a composition to be intended, a so-called "solid-phase reaction" involving mixing and calcining the respective salts of Li, Co, Ni, Mn, and Mg and a "coprecipitation method" involving previously producing a coprecipitated precursor by making Co, Ni, Mn, and Mg exist in each particle and mixing and calcining a Li salt with the precursor. In the synthesis process in the "solid-phase reaction", Mn is particularly difficult to homogeneously form a solid solution with Co and Ni. Therefore, it is difficult to obtain a sample in which the respective elements are homogeneously distributed in each particle. So far, many trials for forming a solid solution of Mn with a part of Ni or Co (LiNi$_{1-x}$Mn$_x$O$_2$ or the like) by the solid-phase method have been reported in documents or the like. However, it is easy to obtain a homogenous phase in an atomic level by selecting the "coprecipitation method". Therefore, in examples described below, the "coprecipitation method" is employed. The description of Patent Document 2 is a reference for a preferable production method of such a precursor.

In order to produce the coprecipitation precursor, it is very important to keep a solution for obtaining the coprecipitation precursor in an inert atmosphere. That is, since Mn among Co, Ni, Mn, and Mg tends to be easily oxidized, it is not easy to produce a coprecipitated hydroxide in which Co, Ni, Mn, and Mg are homogeneously distributed in the divalent state. Accordingly, homogeneous mixing of Co, Ni, Mn, and Mg in an atomic level tends to be insufficient. Particularly, in the composition range of the present invention, the Mn ratio is high as compared with the Co ratio and the Ni ratio. Therefore, it is furthermore important to keep the solution in an inert atmosphere. In examples described below, dissolved oxygen is removed from an aqueous solution by bubbling an inert gas in the aqueous solution and at the same time a reducing agent is also added dropwise.

A method for preparing the precursor to be subjected to the calcining is not particularly limited. A Li compound, a Mn compound, a Ni compound, a Co compound, and a Mg compound may be mixed simply. Further, hydroxides containing transition metal elements may be coprecipitated in a solution and the resultant may be mixed with a Li compound. In order to produce a homogeneous composite oxide, it is preferable to employ a method involving mixing coprecipitated compounds of Mn, Ni, Co, and Mg with a Li compound and calcining the resulting mixture.

In the production of the coprecipitated hydroxide precursor, it is preferable to produce compounds in which Mn, Ni, Co, and Mg are homogeneously mixed. However, the precursor is not limited to a hydroxide. In addition, hardly soluble salts such as carbonates and citrates in which elements homogeneously exist in an atomic level can be used similarly to hydroxides. Further, use of a crystallization reaction or the like using a complexing agent makes it possible to produce a precursor with a high bulk density. At this time, an active material with a higher density and a smaller specific surface area can be obtained by mixing and calcining the precursor with a Li source. Consequently, the energy density per an electrode surface area can be improved.

Herein, examples of raw materials for the coprecipitated hydroxide precursor will be shown. Examples of the Mn compound include manganese oxide, manganese carbonate, manganese sulfate, manganese nitrates, and manganese acetate. Examples of the Ni compound include nickel hydroxide, nickel carbonate, nickel sulfate, nickel nitrate, and nickel acetate. Examples of the Co compound include cobalt sulfate, cobalt nitrate, and cobalt acetate. Further, examples of the Mg compound include magnesium sulfate, magnesium nitrate, magnesium acetate, or the like.

Raw materials to be used for producing the above-mentioned coprecipitated hydroxide precursor may be substances in any form as long as they can cause a precipitation reaction with an aqueous alkaline solution. Preferably, metal salts with high solubility may be used.

The active material for a lithium secondary battery of the present invention can be preferably produced by mixing the above-mentioned coprecipitated hydroxide precursor with a Li compound and thereafter thermally treating the mixture. The active material can be preferably produced by using lithium hydroxide, lithium carbonate, lithium nitrate, lithium acetate, or the like as the Li compound.

In order to obtain an active material with considerably improved discharge capacity, selection of the calcining temperature is very important.

As described in examples below, the solid solution of a lithium-transition metal composite oxide in which "the composition ratios of the metal elements in the solid solution satisfy $Li_{1+(x/3)}Co_{1-x-y-z}Ni_{y/2}Mg_{z/2}Mn_{(2x/3)+(y/2)+(z/2)}$ (x>0; y>0; z>0; x+y+z<1)" has an X-ray diffraction pattern capable of belonging to space group $P3_112$ by setting the calcining temperature to be 920 to 1000° C. Further, accordingly, the intensity ratio between the diffraction peak of (003) plane and the diffraction peak of (114) plane in the solid solution measured by X-ray diffractometry is $I_{(003)}/I_{(114)} \geq 1.15$. Consequently, the discharge capacity is remarkably improved.

If the calcining temperature is too high, the obtained active material tends to be disintegrated along with an oxygen releasing reaction. Further, a phase defined as a monoclinic $Li[Li_{1/3}Mn_{2/3}]O_2$ type other than the hexagonal main phase of the active material tends to be observed as a separated phase but not as a solid solution phase. Such a material has considerably decreased reversible capacity as an active material and therefore is not preferable. In the case of such a material, impurity peaks are observed around 35° and 45° in the X-ray diffraction pattern. Consequently, the calcining temperature is important to be lower than the temperature at which the oxygen releasing reaction of the active material is affected. The oxygen releasing temperature of the active material is about 1000° C. or higher in the composition range of the present invention. However, the oxygen releasing temperature slightly differs in accordance with the composition of the active material. Therefore, it is preferable to previously confirm the oxygen releasing temperature of the active material. Particularly, since it is confirmed that the oxygen releasing temperature of a precursor is shifted to the lower temperature side as the Co amount contained in a sample is higher, it is required to pay attention. A method for confirming the oxygen releasing temperature of the active material may be also a method for subjecting a mixture of the coprecipitated precursor and $LiOH.H_2O$ to a thermogravimetric analysis (DTA-TG measurement) to simulate the calcining reaction process. However, in this method, platinum used in a sample chamber of the measurement instrument is corroded with the Li component to be volatilized and therefore the instrument may be damaged. Accordingly, it is preferable to subject a composition of which crystallization is promoted to a certain extent by previously calcining at a temperature of about 500° C. to the thermogravimetric analysis.

On the other hand, if the calcining temperature is too low, the crystallization is not sufficiently carried out. Therefore, as described in comparative example below, the intensity ratio between the diffraction peak of (003) plane and the diffraction peak of (114) plane measured by X-ray diffractometry is $I_{(003)}/I_{(114)} < 1.15$ and thus the discharge capacity is lowered. Consequently, too low calcining temperature is not also preferable. In the present invention, the calcining temperature is required to be at least 900° C. Sufficient crystallization is important in order to lessen the resistance of crystal grain boundary and promote smooth lithium ion transportation. As a method for determining the degree of crystallization, optical observation using a scanning electron microscope is available. When the positive active material of the present invention is observed by a scanning electron microscope, in the case where a sample calcining temperature is made 800° C. or lower, it is found that the active material is comprised of primary particles with nano order size. However, further increase of the sample synthesis temperature results in crystallization of the active material in a size of sub-micron. That is, large primary particles which bring the improvement of electrode characteristics are obtained.

On the other hand, as the other method of showing the degree of crystallization, there is the half width of X-ray diffraction peak mentioned above. In the present invention, in order to improve not only the discharge capacity but also high rate discharge characteristics, it is preferable that the half width of the diffraction peak of (003) plane in the X-ray diffraction pattern capable of belonging to space group P3$_1$12 is adjusted to 0.15° or less and the half width of the diffraction peak of (114) plane is adjusted to 0.25°. The half width of the diffraction peak of (003) plane is more preferably 0.14° to 0.15° and the half width of the diffraction peak of (114) plane is more preferably 0.23° to 0.25°.

The calcining temperature is needed to be high in order to control the half width of the diffraction peak of (003) plane to be 0.15° or less and the half width of the diffraction peak of (114) plane to be 0.25° or less.

As described above, a preferable calcining temperature differs depending on the oxygen releasing temperature of the active material. Therefore, it is difficult to generally set a preferable calcining temperature range; however if it is preferably 900 to 1050° C. and more preferably 920 to 1000° C., high characteristics can be obtained.

The half width of a diffraction peak is controlled by two factors; the amount of strain exhibiting the degree of crystal lattice unconformity and the size of a crystallite, which is the minimum domain. In order to determine the degree of crystallinity from the half width, it is necessary to separately take these factors. The present inventors have confirmed that strains remain in the lattice of a sample synthesized at a temperature up to 800° C. and that most of the strains in the lattice can be removed by synthesis at a temperature equal to or higher than that temperature by detailed analysis of the half width of the active material of the present invention. Further, it is found that the size of a crystallite becomes large in proportion to an increase of the synthesis temperature. Consequently, also with respect to the composition of the active material of the present invention, it is understood that satisfactory discharge capacity is obtained by aiming particles with sufficiently grown crystallite size and scarcely having stains of lattice in the crystal system. Concretely, it is preferably found to employ a synthesis temperature (calcining temperature) proper for suppressing the amount of stain affecting the lattice constant to 1% or less and growing the crystallite size to 150 nm or larger. In the case where the active material is molded into electrodes and charge-discharge is carried out, the crystallite size is changed by expansion and contraction. However, the fact can realize an effect of keeping the crystallite size 130 nm or larger even in the charge-discharge process and therefore, it is preferable. That is, if the calcining temperature is selected to be a temperature as close as possible to the above-mentioned oxygen releasing temperature of the active material, an active material is first provided with remarkably high reversible capacity.

A nonaqueous electrolyte to be used for the lithium secondary battery of the present invention is not limited. Those generally proposed for use in lithium batteries or the like are usable as the electrolyte. Examples of a nonaqueous solvent to be used for the nonaqueous electrolyte include cyclic carbonic acid esters such as propylene carbonate, ethylene carbonate, butylene carbonate, chloroethylene carbonate, and vinylene carbonate; cyclic esters such as γ-butyrolactone, and γ-valerolactone; chain carbonates such as dimethyl carbonate, diethyl carbonate, and ethyl methyl carbonate; chain esters such as methyl formate, methyl acetate, and methyl butyrate; tetrahydrofuran and derivatives thereof; ethers such as 1,3-dioxane, 1,4-dioxane, 1,2-dimethoxyethane, 1,4-dibutoxyethane, and methyl diglyme; nitriles such as acetonitrile, and benzonitrile; dioxolane and derivatives thereof; ethylene sulfide, sulfolane, sultone and derivatives thereof, and these compounds may be used alone or two or more of them may be used in the form of a mixture; however the nonaqueous solvent is not limited to these examples.

Examples of an electrolyte salt to be used for the nonaqueous electrolyte include inorganic ion salts containing one of lithium (Li), sodium (Na), and potassium (K) such as LiClO$_4$, LiBF$_4$, LiAsF$_6$, LiPF$_6$, LiSCN, LiBr, LiI, Li$_2$SO$_4$, Li$_2$B$_{10}$Cl$_{10}$, NaClO$_4$, NaI, NaSCN, NaBr, KClO$_4$, and KSCN and organic ion salts such as LiCF$_3$SO$_3$, LiN(CF$_3$SO$_2$)$_2$, LiN(C$_2$F$_5$SO$_2$)$_2$, LiN(CF$_3$SO$_2$)(C$_4$F$_9$SO$_2$), LiC(CF$_3$SO$_2$)$_3$, LiC(C$_2$F$_5$SO$_2$)$_3$, (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n C$_4$H$_9$)$_4$NClO$_4$, (n-C$_4$H$_9$)$_4$NI, (C$_2$H$_5$)$_4$N-maleate, (C$_2$H$_5$)$_4$N-benzoate, (C$_2$H$_5$)$_4$N-phthalate, lithium stearyl sulfonate, lithium octylsulfonate, and lithium dodecylbenzenesulfonate, and these ionic compounds may be used alone or two or more of them may be used in the form of a mixture.

Further, use of LiBF$_4$ and a lithium salt having a perfluoroalkyl group such as LiN(C$_2$F$_5$SO$_2$)$_2$ in the form of a mixture can further lower the viscosity of the electrolyte. Therefore, the low temperature characteristics can be further improved and self-discharge can be suppressed. Consequently, use of such a mixture is more desirable.

An ambient temperature molten salt and an ionic liquid may be also used as the nonaqueous electrolyte.

The concentration of the electrolyte salt in the nonaqueous electrolyte is preferably 0.1 mol/L to 5 mol/L and more preferably 0.5 mol/L to 2.5 mol/L in order to reliably obtain a nonaqueous electrolyte battery having high battery characteristics.

A negative material is not particularly limited and any material which has a configuration of precipitating or absorbing lithium ions can be selected. Examples of the negative material include, in addition to titanium materials such as lithium titanate having the spinel crystal structure typified by Li[L$_{1/3}$Ti$_{5/3}$]O$_4$; Si, Sb, or Sn-based alloy material-lithium metal; lithium alloys (lithium metal-containing alloys such as lithium-silicon, lithium-aluminum, lithium-lead, lithium-tin, lithium-aluminum-tin, lithium-gallium, and wood's alloy); lithium composite oxides (lithium-titanium); and silicon oxide, and moreover, alloys, carbon materials (e.g. graphite, hard carbon, lower temperature calcined carbon, amorphous carbon) capable of absorbing and desorbing lithium.

The average particle size of positive active material powders and of negative active material powders is desirably 100 µm or smaller. Particularly, the size of the positive active material powder is desirably 10 µm or smaller in order to improve the high output characteristics of a nonaqueous electrolyte battery. In order to obtain a power in a prescribed shape, a pulverizer or a classifying apparatus may be used. Examples thereof to be used include a mortar, a ball mill, a sand mill, a vibration ball mill, a planetary ball mill, a jet mill, a counter jet mill, a swirling current type jet mill, and a sieve. At the time of pulverization, wet type pulverization in the presence of water or an organic solvent such as hexane can be also employed. A classification method is not particularly limited. A sieve or an air classifying apparatus may be employed based on the necessity for powders subjected to pulverization both in dry manner and in wet manner.

Hereinbefore, the positive active material and the negative active material, which are the main constituent components of a positive electrode and a negative electrode, are described in detail. The positive electrode and the negative electrode may contain a conductive agent, a binder, a thickener, a filler, and the like as other constituent components, in addition to the above-mentioned main constituent components.

The conductive agent is not particularly limited as long as it is an electron conductive material which does not cause an adverse effect on the battery characteristics. Generally, one or a mixture of conductive materials such as natural graphite (scaly graphite, flaky graphite, earthy graphite, and the like), artificial graphite, carbon black, acetylene black, ketjen black, carbon whisker, carbon fibers, metal (copper, nickel, aluminum, silver, gold, and the like) powder, metal fibers, and conductive ceramic materials can be contained as the conductive agent.

From the viewpoint of electron conductivity and application ability, it is preferable to use acetylene black as the conductive agent among these materials. The amount of the conductive agent to be added is preferably from 0.1% by weight to 50% by weight and particularly preferably from 0.5% by weight to 30% by weight based on the total weight of the positive electrode or the negative electrode. Especially, use of acetylene black after pulverized into ultrafine particles with a diameter of 0.1 to 0.5 μm is desirable since the amount of carbon to be needed can be lessened. A mixing method for mixing these components is physical mixing and homogeneous mixing is ideal. Therefore, mixing may be carried out in a dry manner or a wet manner by using a powder mixing apparatus such as a V-type mixing apparatus, an S-type mixing apparatus, an attriter, a ball mill, or a planetary ball mill.

Examples of the binder to be generally used include one or a mixture of thermoplastic resins such as polytetrafluoroethylene (PTFE), poly(vinylidene fluoride) (PVDF), polyethylene, and polypropylene; and polymers having rubber elasticity such as ethylene-propylene-diene terpolymers (EPDM), sulfonated EPDM, styrene-butadiene rubber (SBR), and fluorine-contained rubber. The amount of the binder to be added is preferably from 1% by weight to 50% by weight and particularly preferably from 2% by weight to 30% by weight based on the total weight of the positive electrode or the negative electrode.

The filler may be any material as long as it does not cause an adverse effect on the battery characteristics. Generally, olefin polymers such as polypropylene and polyethylene, amorphous silica, alumina, zeolites, glass, carbon, and the like are used. The amount of the filler to be added is preferably 30% by weight or less based on the total weight of the positive electrode or the negative electrode.

The positive electrode and the negative electrode can be preferably produced by kneading the above-mentioned main constituent components (the positive active material in the positive electrode and the negative material for the negative electrode) and the other materials to obtain a composite, mixing the composite with an organic solvent such as N-methylpyrrolidone or toluene, thereafter, applying or pressure-bonding the obtained mixture solution to the current collector described in detail below, and carrying out heat treatment at a temperature of about 50 to 250° C. for about 2 hours. With respect to the above-mentioned application method, it is preferable, for example, to carry out application in an arbitrary thickness and an arbitrary shape by using a technique such as roller coating with an applicator roller, screen coating, doctor blade coating, spin coating, or a bar coater; however the method is not limited to these examples.

As a separator, porous membranes, nonwoven fabrics, and the like showing excellent high rate performance are preferably used alone or in combination. Examples of a material constituting a separator for a nonaqueous electrolyte battery include polyolefin resins typified by polyethylene and polypropylene; polyester resins typified by poly(ethylene terephthalate) and poly(butylene terephthalate); poly(vinylidene fluoride), vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

From the viewpoint of strength, the porosity of the separator is preferably 98% by volume or less. Also, from the viewpoint of charge-discharge characteristics, the porosity is preferably 20% by volume or more.

Further, as the separator, a polymer gel comprised of, for example, acrylonitrile, ethylene oxide, propylene oxide, methyl methacrylate, vinyl acetate, vinylpyrrolidone, a polymer such as poly(vinylidene fluoride) with an electrolyte may be used. Use of the nonaqueous electrolyte in the gel state as described above is preferable in terms of an effect of preventing liquid leakage.

Further, use of the above-mentioned porous membranes or nonwoven fabrics in combination with the polymer gel for the separator is desirable because of improvement of the liquid retention property of the electrolyte. That is, a film is formed by coating the surface and fine pore wall faces of a polyethylene finely porous membrane with a solvophilic polymer in a thickness of several μm or thinner and the electrolyte is maintained in the fine pores of the film, and thus causing gelation of the solvophilic polymer.

Examples of the solvophilic polymer include, in addition to poly(vinylidene fluoride), polymers obtained by crosslinking acrylate monomers having ethylene oxide groups, ester groups, or the like, epoxy monomers, monomers having isocyanato groups, and the like. These monomers can be crosslinked by heating or radiating active light rays such as ultraviolet (UV) rays, electron beams (EB), and the like to materials containing the monomers and a radical initiator.

The structure of a lithium secondary battery is not particularly limited. Examples of the structure include cylindrical batteries, prismatic batteries, and flat batteries each including a positive electrode, a negative electrode, and a roll type separator.

EXAMPLE 1

Example 1-1

An aqueous mixture solution was produced by dissolving manganese sulfate pentahydrate, nickel sulfate hexahydrate, cobalt sulfate heptahydrate, and magnesium sulfate heptahydrate in ion-exchanged water in such a manner that the ratios of the respective elements Co, Ni, Mn, and Mg were adjusted to 12.5:17.438:68.75:1.312. At this time, the total concentration and the volume were adjusted to 0.667 mol/L and 180 mL, respectively. Next, 600 mL of ion-exchanged water was put in a 1 L beaker and kept at 50° C. by using a hot water bath and 8 N NaOH was added dropwise thereto to adjust the pH of the ion-exchanged water to 12.0. In such a state, bubbling of Ar gas was carried out for 30 minutes to sufficiently remove dissolved oxygen in the solution. The content in the beaker was stirred at a rotation speed of 700 rpm and the aqueous mixture solution of sulfate was added dropwise at a speed of 3 mL/minute. During the time, the temperature was kept constant by using the hot water bath and the pH of the solution in the beaker was kept constant by intermittent dropwise addition of 8N NaOH. At the same time, 50 mL of an aqueous hydrazine solution having a concentration of 2.0 mol/L as a reducing agent was added dropwise at a speed of 0.83 mL/minute. On completion of dropwise addition of both solutions, in the state where the stirring was stopped, the beaker was kept still for 12 hours or longer to sufficiently grow particles of a coprecipitated hydroxide.

In the above-mentioned procedure, if the speed of each solution to be added dropwise was too high, it was impossible to obtain a precursor homogenous in an element level. For example, if the speed to be added dropwise was increased as fast as 10 times, the element distribution in the precursor apparently was heterogeneous. Further, if such a heterogeneous precursor was used for synthesizing an active material, the element distribution after calcining also became heterogeneous. Therefore, the active material synthesized in such a manner could not exhibit sufficient electrode characteristics. In this connection, use of $LiOH.H_2O$, $Co(OH)_2$, $Ni(OH)_2$, MnOOH, and $Mg(OH)_2$ as raw material powders for a solid-phase method is not preferable since the heterogeneity becomes more significant.

Next, the coprecipitated product was taken out by suction filtration and the coprecipitated product was dried at 100° C. in an oven in an air atmosphere under normal pressure. After drying, the coprecipitated product was pulverized over several minutes by a mortar with a diameter of about 120 mm$\phi$ to make the particle diameters uniform and thus a dried powder was obtained.

It was confirmed that the dried powder had a $\beta$-$Ni(OH)_2$ type single phase measured by X-ray diffractometry. Further, it was confirmed that Co, Ni, and Mn were distributed homogeneously by EPMA measurement.

A lithium hydroxide monohydrate powder ($LiOH.H_2O$) was weighed and mixed in such a manner that the Li amount to the metal elements (Ni+Mn+Co+Mg) satisfied the composition formula of Example 1-1 in Table 1 to obtain a mixed powder.

Next, the mixed powder was molded into pellets at a pressure of 6 MPa. The amount of the precursor powder to be molded into pellets was determined by conversion in such a manner that the mass in the form of a product after synthesis was 3 g. As a result, the pellets after molding had a diameter of 25 mm$\phi$ and a thickness of about 10 to 12 mm. The pellets were put on an alumina boat with an entire length of about 100 mm and set in a box type electric furnace and calcined at 1000° C. over 12 hours in an air atmosphere under normal pressure. The inner size of the box type electric furnace was 10 cm in height, 20 cm in width, and 30 cm in depth and heating wires were set at every 20 cm interval in the width direction. After calcining, a switch of the heater was turned off and the alumina boat was cooled spontaneously while being placed in the furnace. As a result, the temperature in the furnace was cooled to about 200° C. after 5 hours and the temperature decrease rate thereafter was relatively moderate. After overnight, it was confirmed that the temperature of the furnace was lowered to 100° C. or lower and thereafter, the pellets were taken out and pulverized by using a mortar to an extent that the particle diameters were made uniform.

The obtained active material had the composition of $Li_{1.2}Co_{0.1}Ni_{0.139}Mg_{0.011}Mn_{0.55}O_2$. With respect to the crystal structure of the active material, as a result of the powder X-ray diffractometry using a Cu(K$\alpha$) tube, an $\alpha$-$NaFeO_2$ type hexagonal structure was observed as a main phase and at the same time, a diffraction peak at around 20 to 30° observed for a $Li[Li_{1/3}Mn_{2/3}]O_2$ type monoclinic structure was partially observed. The entire diffraction peaks were subjected to crystal structure analysis by Rietveld method. The result was well conformed with the crystal structure model belonging to space group $P3_112$.

The area of the diffraction peak of (003) plane was calculated from the diffraction peak at 2θ: 18.6±1°. Further, the area of the diffraction peak of (114) plane was calculated from the diffraction peak at 2θ: 44.1±1°. Thereafter, the intensity ratio (area ratio) $I_{(003)}/I_{(114)}$ of between diffraction peaks was calculated to find that it was 1.41.

In this connection, "peak intensity" means the integrated value obtained by counting the X-ray dose via an X-ray detector. Accordingly, with respect to the peak appearing in the X-ray diffraction pattern, the "peak intensity" is equivalent to "area". In the case where the widths of peaks to be compared were not different or the widths of the peaks were sufficiently narrow, the heights of the peaks may be compared. This case, not only the peak heights but also the areas were compared.

The half width of the diffraction peak of (003) plane was measured from the diffraction peak at 2θ: 18.6±1°, and it was 0.14°. Also, the half width of the diffraction peak of (114) plane was measured from the diffraction peak at 2θ: 44.1±1°, and it was 0.23°.

Further, the data of the X-ray diffraction diagram was subjected to Rietveld analysis by using a computer. In this analysis process, the crystal parameters contained in Gauss function and Lorentz function were made precise. When the lattice strain and the crystallite size were respectively calculated from the crystal parameters measured as described above, and accordingly, the crystallite size was 180 nm.

Examples 1-2 to 1-5)

The active materials of the present invention were synthesized in the same manner as in Example 1-1, except that the calcining temperature was changed to the temperatures (980° C., 960° C., 940° C., and 920° C.) shown in Examples 1-2 to 1-5 in Table 1.

As a result of the X-ray diffractometry, similarly to Example 1-1, an $\alpha$-$NaFeO_2$ type hexagonal structure was observed as a main phase and at the same time, a diffraction peak at around 20 to 30° observed for a $Li[Li_{1/3}Mn_{2/3}]O_2$ type monoclinic structure was partially observed. The entire diffraction peaks were subjected to crystal structure analysis by Rietveld method. The result was well conformed with the crystal structure model belonging to space group $P3_112$. In the same manner as in Example 1-1, the intensity ratio (area ratio) $I_{(003)}/I_{(114)}$ between diffraction peaks was calculated in each example and, it was in a range of 1.15 to 1.35.

Comparative Examples 1-1 to 1-5

The active materials of comparative examples were synthesized in the same manner as in Example 1-1, except that the calcining temperature was changed to the temperatures (900° C., 800° C., 700° C., 550° C., and 1100° C.) shown in Comparative Examples 1-1 to 1-5 in Table 1.

For Comparative Examples 1-1 to 1-4, crystal structure analysis was carried out in the same manner as in Example 1-1. As a result, X-ray diffraction patterns capable of belonging to space group $P3_112$ were observed.

With respect to Comparative Example 1-5, space group was C2/m and different from $P3_112$.

In the same manner as in Example 1-1, the intensity ratio (area ratio) $I_{(003)}/I_{(114)}$ between diffraction peaks was calculated. The calculation result in each example was in a range of 0.95 to 1.13.

Examples 1-6 to 1-9

The active materials of the present invention were synthesized in the same manner as in Example 1-1, except that the composition of the metal elements contained in the coprecipitated oxide precursor and the amount of lithium hydroxide monohydrate to be mixed were changed according to the composition formulas shown in Examples 1-6 to 1-9 in Table 1.

Crystal structure analysis was carried out in the same manner as in Example 1-1. As a result, X-ray diffraction patterns capable of belonging to space group P3$_1$12 were observed.

The intensity ratio (area ratio) $I_{(003)}/I_{(114)}$ between diffraction peaks was calculated in each example, and it was in a range of 1.35 to 1.51.

Comparative Examples 1-6 to 1-9

The active materials of Comparative Examples 1-6 to 1-9 were synthesized in the same manner as in Example 1-1, except that the compositions of the solid solutions, which were the same as those of Examples 1-6 to 1-9, were employed and the calcining temperature was changed to 800° C.

Crystal structure analysis was carried out in the same manner as in Example 1-1. As a result, X-ray diffraction patterns capable of belonging to space group P3$_1$12 were observed.

Also, the intensity ratio (area ratio) $I_{(003)}/I_{(114)}$ between diffraction peaks was calculated in each comparative example, and it was in a range of 1.12 to 1.13.

Comparative Examples 1-10 to 1-15

The raw materials of the metal elements in the coprecipitated hydroxide precursor of Example 1-1 excluding Mg, the composition of the metal elements, and the amount of lithium hydroxide monohydrate to be mixed were changed according to the composition formula Li$_{1.2}$Co$_{0.1}$Ni$_{0.15}$Mn$_{0.55}$O$_2$. Further, the calcining temperatures (1000° C., 900° C., 800° C., 700° C., 550° C., and 1100° C.) shown in Comparative Examples 1-10 to 1-15 in Table 1 were employed. The active materials of comparative examples were synthesized in the same manner as in Example 1-1, except the above points.

For Comparative Examples 1-10 to 1-14, crystal structure analysis was carried out in the same manner as in Example 1-1. As a result, X-ray diffraction patterns capable of belonging to space group P3$_1$12 were observed.

With respect to Comparative Example 1-15, space group was C2/m and different from P3$_1$12.

In the same manner as in Example 1-1, the intensity ratio (area ratio) $I_{(003)}/I_{(114)}$ between diffraction peaks was calculated. The calculation result in each comparative example was in a range of 0.94 to 1.422.

Comparative Example 1-16

In order to compare the characteristics as an active material with those of the present invention, a solid solution Li$_{1.2}$Co$_{0.1}$Ni$_{0.144}$Al$_{0.012}$Mn$_{0.544}$O$_2$ containing Al in place of Mg was synthesized.

An aqueous mixture solution was produced by dissolving manganese sulfate pentahydrate, nickel sulfate hexahydrate, and cobalt sulfate heptahydrate in ion-exchanged water in such a manner that the ratios of the respective elements Co, Ni, and Mn were adjusted to 12.69:18.28:69.03. At this time, the total concentration and the volume were adjusted to 0.667 mol/L and 180 mL, respectively. Next, 600 mL of ion-exchanged water was put in a 1 L beaker and kept at 50° C. by using a hot water bath and 8 N NaOH was added dropwise thereto to adjust the pH of the ion-exchanged water to 12.0. In such a state, bubbling of Ar gas was carried out for 30 minutes to sufficiently remove dissolved oxygen in the solution. The content in the beaker was stirred at a rotation speed of 700 rpm and the aqueous mixture solution of sulfate was added dropwise at a speed of 3 mL/minute. During the time, the temperature was kept constant by using the hot water bath and the pH of the solution in the beaker was kept constant by intermittent dropwise addition of 8N NaOH. At the same time, 50 mL of an aqueous hydrazine solution having a concentration of 2.0 mol/L as a reducing agent was added dropwise at a speed of 0.83 mL/minute. On completion of dropwise addition of both solutions, in the state where the stirring was stopped, the beaker was kept still for 12 hours or longer to sufficiently grow particles of a coprecipitated hydroxide.

Next, the coprecipitated product was taken out by suction filtration and the coprecipitated product was dried at 100° C. in an oven in an air atmosphere under normal pressure. After drying, the coprecipitated product was pulverized over several minutes by a mortar with a diameter of about 120 mmφ to make the particle diameters uniform and thus a dried powder was obtained.

A lithium hydroxide monohydrate powder (LiOH.H$_2$O) and aluminum hydroxide were weighed as to satisfy the composition formula of Comparative Example 1-16 in Table 1 and mixed to obtain a mixed powder.

Next, the mixed powder was molded into pellets at a pressure of 6 MPa. The amount of the precursor powder to be molded into pellets was determined by conversion in such a manner that the mass in the form of a product after synthesis was 3 g. As a result, the pellets after molding had a diameter of 25 mmφ and a thickness of about 10 to 12 mm. The pellets were put on an alumina boat with an entire length of about 100 mm and set in a box type electric furnace and calcined at 1000° C. over 12 hours in an air atmosphere under normal pressure. The inner size of the box type electric furnace was 10 cm in height, 20 cm in width, and 30 cm in depth and heating wires were set at every 20 cm interval in the width direction. After calcining, a switch of the heater was turned off and the alumina boat was cooled spontaneously while being placed in the furnace. As a result, the temperature in the furnace was cooled to about 200° C. after 5 hours and the temperature decrease rate thereafter was relatively moderate. After overnight, it was confirmed that the temperature of the furnace was lowered to 100° C. or lower and thereafter, the pellets were taken out and pulverized by using a mortar to an extent that the particle diameters were made uniform.

The obtained active material had a composition of Li$_{1.2}$Cu$_{0.1}$Ni$_{0.144}$Al$_{0.012}$Mn$_{0.544}$O$_2$. With respect to the crystal structure of the active material, as a result of the powder X-ray diffractometry using a Cu(Kα) tube, an α-NaFeO$_2$ type hexagonal structure was observed as a main phase. The entire diffraction peaks were subjected to crystal structure analysis by Rietveld method. The result was well conformed with the crystal structure model belonging to space group P3$_1$12.

Comparative Example 1-17

In order to compare the characteristics as an active material with those of the present invention, a solid solution Li$_{1.2}$Co$_{0.1}$Ni$_{0.1395}$Al$_{0.021}$Mn$_{0.5395}$O$_2$ containing Al in place of Mg was synthesized.

The active material of comparative example was synthesized in the same manner as in Comparative Example 1-16, except that the composition of the transition metal elements contained in the coprecipitated hydroxide precursor and the amounts of lithium hydroxide monohydrate and aluminum hydroxide to be mixed were changed according to the composition formula shown in Comparative Example 1-17 in Table 1.

Comparative Example 1-18

In order to compare the characteristics as an active material with those of the present invention, a solid solution $Li_{1.2}Co_{0.1}Ni_{0.15}Ti_{0.03}Mn_{0.52}O_2$ containing Ti in place of Mg was synthesized.

The active material of comparative example was synthesized in the same manner as in Comparative Example 1-16, except that the composition of the transition metal elements contained in the coprecipitated hydroxide precursor and the amounts of lithium hydroxide monohydrate and titanium dioxide to be mixed were changed according to the composition formula shown in Comparative Example 1-18 in Table 1.

Comparative Example 1-19

In order to compare the characteristics as an active material with those of the present invention, a solid solution $Li_{1.2}Co_{0.1}Ni_{0.15}Ti_{0.05}Mn_{0.5}O_2$ containing Ti in place of Mg was synthesized.

The active material of comparative example was synthesized in the same manner as in Comparative Example 1-16, except that the composition of the transition metal elements contained in the coprecipitated hydroxide precursor and the amounts of lithium hydroxide monohydrate and titanium dioxide to be mixed were changed according to the composition formula shown in Comparative Example 1-19 in Table 1.

(Production and Evaluation of Lithium Secondary Battery)

Using the respective active materials of Examples 1-1 to 1-9 and Comparative Examples 1-1 to 1-19 as a positive active material for a lithium secondary battery, lithium secondary batteries were produced by the following procedure and the battery characteristics were evaluated.

Each active material, acetylene black (AB), and poly(vinylidene fluoride) (PVdF) were mixed at a weight ratio of 85:8:7. The obtained mixture was mixed with N-methylpyrrolidone as a dispersant and kneaded and dispersed to prepare an application solution. With respect to PVdF, a solution in which solid matter was dissolved and dispersed was used and the ratio was calculated based on solid matter weight. The application solution was applied to an aluminum foil current collector with a thickness of 20 μm to produce a positive electrode plate. The electrode weight and thickness were standardized, so that the test conditions were made same for all of the batteries.

Lithium metal was used for the counter electrode (negative electrode) to observe solely the behavior of each positive electrode. The lithium metal was firmly attached to a nickel foil current collector. However, an adjustment for sufficiently allowing the capacity of each lithium secondary battery to be positive electrode dominant was carried out.

A solution obtained by dissolving $LiPF_6$ in an amount to give a concentration of 1 mol/L in a mixture solvent of EC/EMC/DMC at a volume ratio of 6:7:7 was used as an electrolyte solution. A finely porous polypropylene membrane in which the electrolyte retention property was improved by surface modification using polyacrylate was used as a separator. Further, a material obtained by attaching a lithium metal foil to a nickel plate was used as a reference electrode. A metal-resin composite film of poly(ethylene terephthalate) (15 μm)/aluminum foil (50 μm)/metal adhesive polypropylene film (50 μm) was used as an outer casing. Electrodes were housed in the outer casing in such a manner that the open end parts of a positive electrode terminal, a negative electrode terminal, and a reference electrode terminal were exposed outside. Sealing margins of the mutually facing inner faces of the metal-resin composite film were air-tightly sealed except the parts for forming a solution injection hole.

Each lithium secondary battery produced in the above-mentioned manner was subjected to 5 cycles of initial charge-discharge step at 20° C. The voltage control was carried out entirely for the positive electrode potential. Charge was constant current constant voltage charge at an electric current of 0.1 ItA and a voltage of 4.5 V. With respect to the condition of charge termination, it was set at a moment when the electric current value was decreased to 1/6. Discharge was constant current discharge at an electric current of 0.1 ItA and an end-of-discharge voltage of 2.0 V. In all of the cycles, a rest of 30 minutes was set after charge and after discharge. With respect to the lithium secondary battery of Example 1-1, at the time of the initial charge, a region in which a potential variation was relatively plateau at a potential around 4.45 V was observed over a long duration from the time when the charge capacity exceeded 100 mAh/g.

Successively, a charge-discharge cycle test was carried out. The voltage control was carried out entirely for the positive electrode potential. The condition of the charge-discharge cycle test was the same as the condition for the initial charge-discharge step, except that the charge voltage was adjusted to 4.3 V (vs. Li/Li$^+$). In all of the cycles, a rest of 30 minutes was set after charge and after discharge. The discharge capacity at the 5th cycle in the charge-discharge cycle test was recorded as "discharge capacity (mAh/g)".

Next, a high rate discharge test was carried out. The voltage control was carried out entirely for the positive electrode potential. The condition of the charge-discharge cycle test was the same as the condition for the initial charge-discharge step, except that the charge voltage was adjusted to 4.3 V (vs. Li/Li$^+$). The discharge thereafter was constant current discharge at 2 ItA and an end-of-discharge voltage of 2.0 V. A rest of 30 minutes was set after charge and after discharge. The ratio of the discharge capacity obtained at a current of 2 ItA to the discharge capacity obtained at a current of 0.1 ItA was recorded as "rate ratio (%)".

Table 1 shows the calculation results of the intensity ratio (area ratio) $I_{(003)}/I_{(114)}$ between the diffraction peak of (003) plane and the diffraction peak of (114) plane, the results of the charge-discharge cycle test (0.1 C capacity), and the rate ratios.

TABLE 1

| | Composition | Space group | Calcining temperature (° C.) | Peak intensity ratio $I_{003}/I_{114}$ | Discharge capacity mAh/g | Rate ratio % |
|---|---|---|---|---|---|---|
| Example 1-1 | $Li_{1.2}Co_{0.1}Ni_{0.139}Mg_{0.011}Mn_{0.55}O_2$ | $P3_112$ | 1000 | 1.41 | 242 | 71 |
| Example 1-2 | $Li_{1.2}Co_{0.1}Ni_{0.139}Mg_{0.011}Mn_{0.55}O_2$ | $P3_112$ | 980 | 1.35 | 233 | 68 |
| Example 1-3 | $Li_{1.2}Co_{0.1}Ni_{0.139}Mg_{0.011}Mn_{0.55}O_2$ | $P3_112$ | 960 | 1.27 | 225 | 66 |
| Example 1-4 | $Li_{1.2}Co_{0.1}Ni_{0.139}Mg_{0.011}Mn_{0.55}O_2$ | $P3_112$ | 940 | 1.23 | 210 | 67 |
| Example 1-5 | $Li_{1.2}Co_{0.1}Ni_{0.139}Mg_{0.011}Mn_{0.55}O_2$ | $P3_112$ | 920 | 1.15 | 201 | 68 |
| Example 1-6 | $Li_{1.17}Co_{0.09}Ni_{0.18}Mg_{0.02}Mn_{0.54}O_2$ | $P3_112$ | 1000 | 1.48 | 203 | 67 |
| Example 1-7 | $Li_{1.21}Co_{0.21}Ni_{0.06}Mg_{0.02}Mn_{0.50}O_2$ | $P3_112$ | 1000 | 1.51 | 218 | 70 |
| Example 1-8 | $Li_{1.18}Co_{0.1}Ni_{0.15}Mg_{0.03}Mn_{0.54}O_2$ | $P3_112$ | 1000 | 1.47 | 245 | 65 |
| Example 1-9 | $Li_{1.2}Co_{0.08}Ni_{0.15}Mg_{0.01}Mn_{0.56}O_2$ | $P3_112$ | 1000 | 1.35 | 211 | 65 |
| Comparative Example 1-1 | $Li_{1.2}Co_{0.1}Ni_{0.139}Mg_{0.011}Mn_{0.55}O_2$ | $P3_112$ | 900 | 1.13 | 185 | 50 |
| Comparative Example 1-2 | $Li_{1.2}Co_{0.1}Ni_{0.139}Mg_{0.011}Mn_{0.55}O_2$ | $P3_112$ | 800 | 1.11 | 165 | 49 |
| Comparative Example 1-3 | $Li_{1.2}Co_{0.1}Ni_{0.139}Mg_{0.011}Mn_{0.55}O_2$ | $P3_112$ | 700 | 1.05 | 152 | 49 |
| Comparative Example 1-4 | $Li_{1.2}Co_{0.1}Ni_{0.139}Mg_{0.011}Mn_{0.55}O_2$ | $P3_112$ | 550 | 0.95 | 115 | 50 |
| Comparative Example 1-5 | $Li_{1.2}Co_{0.1}Ni_{0.139}Mg_{0.011}Mn_{0.55}O_2$ | C2/m | 1100 | 1.42 | 60 | 20 |
| Comparative Example 1-6 | $Li_{1.17}Co_{0.09}Ni_{0.18}Mg_{0.02}Mn_{0.54}O_2$ | $P3_112$ | 800 | 1.13 | 135 | 51 |
| Comparative Example 1-7 | $Li_{1.21}Co_{0.21}Ni_{0.06}Mg_{0.02}Mn_{0.50}O_2$ | $P3_112$ | 800 | 1.12 | 142 | 56 |
| Comparative Example 1-8 | $Li_{1.18}Co_{0.1}Ni_{0.15}Mg_{0.03}Mn_{0.54}O_2$ | $P3_112$ | 800 | 1.12 | 170 | 53 |
| Comparative Example 1-9 | $Li_{1.2}Co_{0.08}Ni_{0.15}Mg_{0.01}Mn_{0.56}O_2$ | $P3_112$ | 800 | 1.13 | 168 | 51 |
| Comparative Example 1-10 | $Li_{1.2}Co_{0.1}Ni_{0.15}Mn_{0.55}O_2$ | $P3_112$ | 1000 | 1.414 | 223 | 52 |
| Comparative Example 1-11 | $Li_{1.2}Co_{0.1}Ni_{0.15}Mn_{0.55}O_2$ | $P3_112$ | 900 | 1.109 | 186 | 55 |
| Comparative Example 1-12 | $Li_{1.2}Co_{0.1}Ni_{0.15}Mn_{0.55}O_2$ | $P3_112$ | 800 | 1.108 | 166 | 55 |
| Comparative Example 1-13 | $Li_{1.2}Co_{0.1}Ni_{0.15}Mn_{0.55}O_2$ | $P3_112$ | 700 | 1.07 | 154 | 50 |
| Comparative Example 1-14 | $Li_{1.2}Co_{0.1}Ni_{0.15}Mn_{0.55}O_2$ | $P3_112$ | 550 | 0.94 | 116 | 50 |
| Comparative Example 1-15 | $Li_{1.2}Co_{0.1}Ni_{0.15}Mn_{0.55}O_2$ | C2/m | 1100 | 1.422 | 66 | 20 |
| Comparative Example 1-16 | $Li_{1.2}Co_{0.1}Ni_{0.144}Al_{0.012}Mn_{0.544}O_2$ | $P3_112$ | 1000 | 1.43 | 194 | 56 |
| Comparative Example 1-17 | $Li_{1.2}Co_{0.1}Ni_{0.1395}Al_{0.021}Mn_{0.5395}O_2$ | $P3_112$ | 1000 | 1.42 | 181 | 52 |
| Comparative Example 1-18 | $Li_{1.2}Co_{0.1}Ni_{0.15}Ti_{0.03}Mn_{0.52}O_2$ | $P3_112$ | 1000 | 1.47 | 183 | 55 |
| Comparative Example 1-19 | $Li_{1.2}Co_{0.1}Ni_{0.15}Ti_{0.05}Mn_{0.5}O_2$ | $P3_112$ | 1000 | 1.45 | 172 | 53 |

In the case where the composition ratios (metal element ratios) of the metal elements contained in the solid solution of each lithium-transition metal composite oxide were made as follows: $Li_{1+(x/3)}Co_{1-x-y-z}Ni_{y/2}Mg_{z/2}Mn_{(2x/3)+(y/2)+(z/2)}O_2$, X=0.6, y=0.278, and z=0.022 in Examples 1-1 to 1-5; x=0.51, y=0.36, and z=0.0334 in Example 1-6; x=0.63, y=0.12, and z=0.04 in Example 1-7; x=0.54, y=0.30, and z=0.06 in Example 1-8; and x=0.60, y=0.30, and z=0.02 in Example 1-9. All examples satisfied the above-mentioned metal element ratios and had X-ray diffraction patterns capable of belonging to space group $P3_112$. Further, all examples had intensity ratios between the diffraction peak of (003) plane and the diffraction peak of (114) plane measured by X-ray diffractometry satisfying $I_{(003)}/I_{(114)} \geq 1.15$. Therefore, the active materials of Examples 1-1 to 1-9 gave discharge capacity exceeding 200 mAh/g and a rate ratio of 65% or more. Consequently, it was confirmed that these active materials of examples had high discharge capacity and were excellent in high rate discharge characteristics.

Each of the active materials of Comparative Examples 1-1 to 1-4 had the same metal element ratios as those of Examples 1-1 to 1-5 and had X-ray diffraction patterns capable of belonging to space group $P3_112$. However, in these comparative examples, the calcining temperatures were 900° C., 800° C., 700° C., and 550° C., respectively, and lower than 1000 to 920° C. of Examples 1-1 to 1-5. Therefore, in these comparative examples, the intensity ratio of the diffraction peaks were as low as $I_{(003)}/I_{(114)} < 1.15$ and discharge capacity lower than 200 mAh/g was obtained and also the rate ratio was 50% or less.

The active material of Comparative Example 1-5 had the same metal element ratios as those of Examples 1-1 to 1-5. However in this comparative example, the calcining temperature was as high as 1100° C. Therefore, although the intensity ratio of the diffraction peaks satisfied $I_{(003)}/I_{(114)} \geq 1.15$, it failed to have X-ray diffraction patterns capable of belonging to space group $P3_112$. Therefore, in the comparative example, the discharge capacity and the rate ratio were extremely lowered.

Each of the active materials of Comparative Examples 1-6 to 1-9 had the same metal element ratios as those of Examples 1-6 to 1-9 and had X-ray diffraction patterns capable of belonging to space group $P3_112$. However in these comparative examples, the calcining temperature was 800° C., which was lower than 1000° C. in Examples 1-6 to 1-9. Therefore, in the comparative example, the intensity ratio of the diffraction peaks was as low as $I_{(003)}/I_{(114)} < 1.15$ and discharge capacity lower than 200 mAh/g was obtained and also the rate ratio was 56% or less.

Each of the active materials of Comparative Examples 1-10 to 1-15 contained no Mg. Among the active materials, in the case where the calcining temperature was 1000° C. similarly to Comparative Example 1-10, the solid solution of the lithium-transition metal composite oxide had X-ray diffraction patterns capable of belonging to space group $P3_112$, the intensity ratio between the diffraction peaks satisfied $I_{(003)}/I_{(114)} \geq 1.15$ and discharge capacity exceeding 200 mAh/g was obtained. However, the rate ratio was 52% and similarly to the active materials of Comparative Examples 1-11 to 1-15, the high rate discharge characteristics were inferior. Accordingly, both of the discharge capacity and the high rate discharge characteristics could be improved by adding Mg to the active material and calcining at 1000° C., similarly to Example 1-1. On the other hand, in the case of the active material containing no Mg similarly to Comparative Example 1-10, although the discharge capacity was improved by calcining at 1000° C., the high rate discharge characteristics were not improved.

Furthermore, in comparison between Example 1-1 and Comparative Example 1-10, the discharge capacity of the active material of Example 1-1 was 242 mAh/g, whereas the discharge capacity of the active material of Comparative Example 1-10 was 223 mAh/g. That is, it could be understood that the discharge capacity was remarkably improved by substituting a part of Ni with Mg. It cannot be said that the remarkable improvement of the discharge capacity by addition of Mg as described above could be expected.

Moreover, Example 1-3 and Comparative Example 1-10 has approximately the same discharge capacity. However, the active material of Comparative Example 1-10 was obtained by calcining at 1000° C., whereas the active material of Example 1-3 was obtained by calcining at 960° C. Therefore, it can be said that addition of Mg makes it possible to lower the calcining temperature in order to obtain approximately the same discharge capacity. Consequently, there is also an effect to save energy to be supplied to the calcining furnace at the time of calcining by employing the active material of the present invention.

On the other hand, even if the active material containing no Mg, in the case where the calcining temperature was 900° C. or lower, similarly to Comparative Examples 1-11 to 1-14, the intensity ratio between the diffraction peaks was $I_{(003)}/I_{(114)} < 1.15$. However, in comparison between Comparative Examples 1-1 and 1-11 in which the calcining temperature was 900° C., the active material of Comparative Example 1-1 containing Mg had a discharge capacity of 185 mAh/g, whereas the active material of Comparative Examples 1-11 containing no Mg had a discharge capacity of 186 mAh/g. Also, in comparison between Comparative Examples 1-2 and 1-12 in which the calcining temperature was 800° C., the active material of Comparative Example 1-2 containing Mg had a discharge capacity of 165 mAh/g, whereas the active material of Comparative Examples 1-12 containing no Mg had a discharge capacity of 166 mAh/g. Accordingly, the discharge capacity was approximately the same in both active materials (also the same level in the case of calcining temperature at 700° C. and 550° C.) and even if a part of Ni was substituted with Mg, the discharge capacity was not improved.

Consequently, in order to remarkably improve the discharge capacity, it is not sufficient to merely make the composition ratios of the metal elements contained in the solid solution of the lithium-transition metal composite oxide $Li_{1+(x/3)}Co_{1-x-y-z}Ni_{y/2}Mg_{z/2}Mn_{(2x/3)+(y/2)+(z/2)}$ (x>0; y>0; z>0; x+y+z<1). It can be said that the intensity ratio between the diffraction peak of (003) plane and the diffraction peak of (114) plane measured by X-ray diffractometry is required to satisfy $I_{(003)}/I_{(114)} \geq 1.15$.

Similarly to Comparative Examples 1-16 to 1-19, in the case of the active materials containing Al and Ti in place of Mg and calcined at 1000° C., the solid solutions of the lithium-transition metal composite oxides had X-ray diffraction patterns capable of belonging to space group $P3_112$ and the intensity ratio between diffraction peaks satisfied $I_{(003)}/I_{(114)} \geq 1.15$. However, in these comparative examples, discharge capacity exceeding 200 mAh/g could not be obtained and the high rate discharge characteristics were also inferior.

As described above, it can be said that the active material of the present invention satisfies three requirements: "the composition ratios of the metal elements contained in the solid solution of the lithium-transition metal composite oxide satisfy $Li_{1+(x/3)}Co_{1-x-y-z}Ni_{y/2}Mg_{z/2}Mn_{(2x/3)+(y/2)+(z/2)}$ (x>0; y>0; z>0; x+y+z<1) ";" the solid solution has an X-ray diffraction pattern capable of belonging to space group $P3_112$"; and "the intensity ratio between the diffraction peak of (003) plane and the diffraction peak of (114) plane satisfies $I_{(003)}/I_{(114)} \geq 1.15$", so that high discharge capacity exceeding 200 mAh/g can be obtained and excellent high rate discharge characteristics can be provided.

Example 2

Example 2-1

An active material having a composition $Li_{1.2}Co_{0.1}Ni_{0.139}Mg_{0.011}Mn_{0.55}O_2$ was synthesized at a calcining temperature of 1000° C. in the same manner as in Example 1-1.

With respect to the crystal structure of the obtained active material, similarly to Example 1-1, as a result of the powder X-ray diffractometry using a Cu(Kα) tube, an α-NaFeO$_2$ type hexagonal structure was observed as a main phase and at the same time, a diffraction peak at around 20 to 30° observed for a $Li[Li_{1/3}Mn_{2/3}]O_2$ type monoclinic structure was partially observed. The entire diffraction peaks were subjected to crystal structure analysis by Rietveld method. The result was well conformed with the crystal structure model belonging to space group $P3_112$.

The half width of the diffraction peak of (003) plane calculated from the diffraction peak at 2θ: 18.6±1° was 0.14°. Further, the half width of the diffraction peak of (114) plane calculated from the diffraction peak at 2θ: 44.1±1° was 0.23°.

Further, the data of the X-ray diffraction pattern was subjected to Rietveld analysis by using a computer. In this analysis process, the crystal parameters contained in Gauss function and Lorentz function were made precise. When the lattice strain and the crystallite size were respectively calculated from the crystal parameters measured as described above, and accordingly, the crystallite size was 180 nm.

Examples 2-2 to 2-10

The active materials of the present invention were synthesized in the same manner as in Example 2-1, except that the composition of the metal elements contained in the coprecipitated oxide precursor and the amount of lithium hydroxide monohydrate to be mixed were changed according to the composition formulas shown in Examples 2-2 to 2-10 in Table 2.

As a result of X-ray diffractometry, similarly to Example 2-1, an α-NaFeO$_2$ type hexagonal structure was observed as a main phase and at the same time, a diffraction peak at around 20 to 30° observed for a $Li[Li_{1/3}Mn_{2/3}]O_2$ type monoclinic structure was partially observed. The entire diffraction peaks were subjected to crystal structure analysis by Rietveld method. The result was well conformed with the crystal structure model belonging to space group $P3_112$.

The half width of the diffraction peak of (003) plane calculated from the diffraction peak at 2θ: 18.6±1° in each example was 0.14° to 0.15°. Further, the half width of the diffraction peak of (114) plane calculated from the diffraction peak at 2θ: 44.1±1° in each example was 0.23° to 0.25°.

Further, crystallite sizes were calculated in the same manner as in Example 2-1. As a result, the crystallite size in each example was 180 to 200 nm.

Comparative Examples 2-1 to 2-4

Using the raw materials of the metal elements in the coprecipitated hydroxide precursor of Example 2-1 excluding Mg, the active material of composition formulas of Comparative Examples 2-1 to 2-4 in Table 2 was synthesized. Further, the calcining temperatures of Comparative Examples 2-1 to 2-4 were changed to 1000° C., 900° C., 800° C., and 700° C., respectively. The active materials of these comparative examples were synthesized in the same manner as in Example 2-1, except the above points.

In the same manner as in Example 2-1, the half widths of the diffraction peak of (003) plane and the diffraction peak of (114) plane in each of comparative examples were measured and the crystallite size was calculated.

Comparative Examples 2-5 to 2-7

In Comparative Examples 2-5 to 2-7, the solid solution of the same composition as that of Example 2-2 (calcining temperature 1000° C.) was synthesized in the same manner as in Example 2-1, except that the calcining temperature was changed to 700° C., 800° C., and 900° C., respectively.

In the same manner as in Example 2-1, the half widths of the diffraction peak of (003) plane and the diffraction peak of (114) plane in each of comparative examples were measured and the crystallite size was calculated.

Comparative Examples 2-8 to 2-14

The active materials of Comparative Examples 2-8 to 2-10 were comprised of the solid solutions of the same composition as those of Examples 2-3, 2-1, and 2-4. The active materials of Comparative Examples 2-11 to 2-14 were comprised of the solid solutions of the same composition as those of Examples 2-7 to 2-10. The active materials of these comparative examples were synthesized in the same manner as in Example 2-1, except that the calcining temperature was changed from 1000° C. to 900° C.

In the same manner as in Example 2-1, the half widths of the diffraction peak of (003) plane and the diffraction peak of (114) plane in each of comparative examples were measured and the crystallite size was calculated.

Comparative Examples 2-15 and 2-16

The active materials of these comparative examples were synthesized in the same manner as in Example 2-1, except that the composition of the transition metal elements contained in the coprecipitated oxide precursor of Example 2-1 and the amount of lithium hydroxide monohydrate to be mixed were changed according to the composition formulas shown in Comparative Examples 2-15 and 2-16 in Table 2.

In the same manner as in Example 2-1, the half widths of the diffraction peak of (003) plane and the diffraction peak of (114) plane in each of comparative examples were measured and the crystallite size was calculated.

Comparative Example 2-17

An active material $Li_{1.2}Co_{0.1}Ni_{0.144}Al_{0.012}Mn_{0.544}O_2$ containing Al in place of Mg was synthesized in the same manner as in Comparative Example 1-16.

Comparative Example 2-18

An active material $Li_{1.2}Co_{0.1}Ni_{0.1395}Al_{0.021}Mn_{0.5395}O_2$ containing Al in place of Mg was synthesized in the same manner as in Comparative Example 1-17.

Comparative Example 2-19

An active material $Li_{1.2}Co_{0.1}Ni_{0.15}Ti_{0.03}Mn_{0.52}O_2$ containing Ti in place of Mg was synthesized in the same manner as in Comparative Example 1-18.

Comparative Example 2-20

An active material $Li_{1.2}Co_{0.1}Ni_{0.15}Ti_{0.05}Mn_{0.5}O_2$ containing Ti in place of Mg was synthesized in the same manner as in Comparative Example 1-19.

(Production and Evaluation of Lithium Secondary Battery)

Using the respective active materials of Examples 2-1 to 2-10 and Comparative Examples 2-1 to 2-20 as a positive active material for a lithium secondary battery, lithium secondary batteries were produced in the same procedure as that in Example 1 and the battery characteristics were evaluated.

Table 2 shows the measurement results of the half width, the calculation results of the crystallite size, the results of the charge-discharge cycle test (0.1 C capacity), and the rate ratios.

TABLE 2

| | Composition | Li[Li$_{1/3}$Mn$_{2/3}$]O$_2$ x | LiNi$_{1/2}$Mn$_{1/2}$O$_2$ y | LiMg$_{1/2}$Mn$_{1/2}$O$_2$ z | LiCoO$_2$ 1 − x − y − z |
|---|---|---|---|---|---|
| Example 2-1 | Li$_{1.2}$Co$_{0.1}$Ni$_{0.139}$Mg$_{0.011}$Mn$_{0.55}$O$_2$ | 0.6 | 0.278 | 0.022 | 0.1 |
| Example 2-2 | Li$_{1.2}$Co$_{0.1}$Ni$_{0.147}$Mg$_{0.003}$Mn$_{0.55}$O$_2$ | 0.6 | 0.294 | 0.006 | 0.1 |
| Example 2-3 | Li$_{1.2}$Co$_{0.1}$Ni$_{0.144}$Mg$_{0.006}$Mn$_{0.55}$O$_2$ | 0.6 | 0.288 | 0.012 | 0.1 |
| Example 2-4 | Li$_{1.2}$Co$_{0.1}$Ni$_{0.135}$Mg$_{0.015}$Mn$_{0.55}$O$_2$ | 0.6 | 0.270 | 0.030 | 0.1 |
| Example 2-5 | Li$_{1.2}$Co$_{0.1}$Ni$_{0.12}$Mg$_{0.03}$Mn$_{0.55}$O$_2$ | 0.6 | 0.240 | 0.060 | 0.1 |
| Example 2-6 | Li$_{1.2}$Co$_{0.1}$Ni$_{0.09}$Mg$_{0.06}$Mn$_{0.55}$O$_2$ | 0.6 | 0.180 | 0.120 | 0.1 |
| Example 2-7 | Li$_{1.196}$Co$_{0.1}$Ni$_{0.15}$Mg$_{0.006}$Mn$_{0.548}$O$_2$ | 0.578 | 0.3 | 0.012 | 0.1 |
| Example 2-8 | Li$_{1.192}$Co$_{0.1}$Ni$_{0.15}$Mg$_{0.012}$Mn$_{0.546}$O$_2$ | 0.576 | 0.3 | 0.024 | 0.1 |
| Example 2-9 | Li$_{1.186}$Co$_{0.1}$Ni$_{0.15}$Mg$_{0.021}$Mn$_{0.543}$O$_2$ | 0.558 | 0.3 | 0.042 | 0.1 |
| Example 2-10 | Li$_{1.18}$Co$_{0.1}$Ni$_{0.15}$Mg$_{0.03}$Mn$_{0.54}$O$_2$ | 0.540 | 0.3 | 0.060 | 0.1 |
| Comparative Example 2-1 | Li$_{1.2}$Co$_{0.1}$Ni$_{0.15}$Mn$_{0.55}$O$_2$ | 0.6 | 0.3 | 0 | 0.1 |
| Comparative Example 2-2 | Li$_{1.2}$Co$_{0.1}$Ni$_{0.15}$Mn$_{0.55}$O$_2$ | 0.6 | 0.3 | 0 | 0.1 |
| Comparative Example 2-3 | Li$_{1.2}$Co$_{0.1}$Ni$_{0.15}$Mn$_{0.55}$O$_2$ | 0.6 | 0.3 | 0 | 0.1 |
| Comparative Example 2-4 | Li$_{1.2}$Co$_{0.1}$Ni$_{0.15}$Mn$_{0.55}$O$_2$ | 0.6 | 0.3 | 0 | 0.1 |
| Comparative Example 2-5 | Li$_{1.2}$Co$_{0.1}$Ni$_{0.147}$Mg$_{0.003}$Mn$_{0.55}$O$_2$ | 0.6 | 0.294 | 0.006 | 0.1 |
| Comparative Example 2-6 | Li$_{1.2}$Co$_{0.1}$Ni$_{0.147}$Mg$_{0.003}$Mn$_{0.55}$O$_2$ | 0.6 | 0.294 | 0.006 | 0.1 |
| Comparative Example 2-7 | Li$_{1.2}$Co$_{0.1}$Ni$_{0.147}$Mg$_{0.003}$Mn$_{0.55}$O$_2$ | 0.6 | 0.294 | 0.006 | 0.1 |
| Comparative Example 2-8 | Li$_{1.2}$Co$_{0.1}$Ni$_{0.144}$Mg$_{0.006}$Mn$_{0.55}$O$_2$ | 0.6 | 0.288 | 0.012 | 0.1 |
| Comparative Example 2-9 | Li$_{1.2}$Co$_{0.1}$Ni$_{0.139}$Mg$_{0.011}$Mn$_{0.55}$O$_2$ | 0.6 | 0.278 | 0.022 | 0.1 |
| Comparative Example 2-10 | Li$_{1.2}$Co$_{0.1}$Ni$_{0.135}$Mg$_{0.015}$Mn$_{0.55}$O$_2$ | 0.6 | 0.270 | 0.030 | 0.1 |
| Comparative Example 2-11 | Li$_{1.196}$Co$_{0.1}$Ni$_{0.15}$Mg$_{0.006}$Mn$_{0.548}$O$_2$ | 0.578 | 0.3 | 0.012 | 0.1 |
| Comparative Example 2-12 | Li$_{1.192}$Co$_{0.1}$Ni$_{0.15}$Mg$_{0.012}$Mn$_{0.546}$O$_2$ | 0.576 | 0.3 | 0.024 | 0.1 |
| Comparative Example 2-13 | Li$_{1.186}$Co$_{0.1}$Ni$_{0.15}$Mg$_{0.021}$Mn$_{0.543}$O$_2$ | 0.558 | 0.3 | 0.042 | 0.1 |
| Comparative Example 2-14 | Li$_{1.18}$Co$_{0.1}$Ni$_{0.15}$Mg$_{0.03}$Mn$_{0.54}$O$_2$ | 0.540 | 0.3 | 0.060 | 0.1 |

TABLE 2-continued

| | | | | | |
|---|---|---|---|---|---|
| Comparative Example 2-15 | $LiCo_{0.33}Ni_{0.28}Mg_{0.05}Mn_{0.33}O_2$ | 0.000 | 0.567 | 0.100 | 0.333 |
| Comparative Example 2-16 | $LiCo_{0.33}Ni_{0.33}Mn_{0.33}O_2$ | 0.000 | 0.333 | 0.333 | 0.333 |

| | | $Li[Li_{1/3}Mn_{2/3}]O_2$ | $LiNi_{1/2}Mn_{1/2}O_2$ | $LiAlO_2$ | $LiCoO_2$ |
|---|---|---|---|---|---|
| Comparative Example 2-17 | $Li_{1.2}Co_{0.1}Ni_{0.144}Al_{0.012}Mn_{0.544}O_2$ | 0.6 | 0.288 | 0.012 | 0.1 |
| Comparative Example 2-18 | $Li_{1.2}Co_{0.1}Ni_{0.1395}Al_{0.021}Mn_{0.5395}O_2$ | 0.6 | 0.279 | 0.021 | 0.1 |

| | | $Li[Li_{1/3}Mn_{2/3}]O_2$ | $LiNi_{1/2}Mn_{1/2}O_2$ | $LiNi_{1/2}Ti_{1/2}O_2$ | $LiCoO_2$ |
|---|---|---|---|---|---|
| Comparative Example 2-19 | $Li_{1.2}Co_{0.1}Ni_{0.15}Ti_{0.03}Mn_{0.52}O_2$ | 0.6 | 0.24 | 0.06 | 0.1 |
| Comparative Example 2-20 | $Li_{1.2}Co_{0.1}Ni_{0.15}Ti_{0.05}Mn_{0.5}O_2$ | 0.6 | 0.2 | 0.1 | 0.1 |

| | (003) Half width deg | (104) Half width deg | Crystallite size nm | Discharge capacity mAh/g | Rate ratio % |
|---|---|---|---|---|---|
| Example 2-1 | 0.14 | 0.23 | 180 | 242 | 71 |
| Example 2-2 | 0.14 | 0.24 | 180 | 243 | 71 |
| Example 2-3 | 0.14 | 0.23 | 190 | 236 | 73 |
| Example 2-4 | 0.14 | 0.24 | 200 | 252 | 63 |
| Example 2-5 | 0.14 | 0.25 | 190 | 231 | 67 |
| Example 2-6 | 0.15 | 0.24 | 190 | 243 | 59 |
| Example 2-7 | 0.14 | 0.23 | 180 | 242 | 63 |
| Example 2-8 | 0.14 | 0.25 | 200 | 250 | 58 |
| Example 2-9 | 0.15 | 0.24 | 180 | 245 | 67 |
| Example 2-10 | 0.14 | 0.24 | 190 | 242 | 65 |
| Comparative Example 2-1 | 0.14 | 0.23 | 190 | 223 | 52 |
| Comparative Example 2-2 | 0.17 | 0.28 | 140 | 186 | 55 |
| Comparative Example 2-3 | 0.2 | 0.3 | 110 | 166 | 55 |
| Comparative Example 2-4 | 0.3 | 0.43 | 80 | 154 | 50 |
| Comparative Example 2-5 | 0.31 | 0.45 | 80 | 170 | 50 |
| Comparative Example 2-6 | 0.21 | 0.31 | 110 | 185 | 51 |
| Comparative Example 2-7 | 0.17 | 0.28 | 140 | 195 | 52 |
| Comparative Example 2-8 | 0.17 | 0.29 | 130 | 196 | 50 |
| Comparative Example 2-9 | 0.16 | 0.28 | 140 | 198 | 50 |
| Comparative Example 2-10 | 0.16 | 0.28 | 140 | 193 | 52 |
| Comparative Example 2-11 | 0.17 | 0.29 | 130 | 190 | 54 |
| Comparative Example 2-12 | 0.16 | 0.29 | 130 | 190 | 53 |
| Comparative Example 2-13 | 0.16 | 0.29 | 130 | 195 | 53 |
| Comparative Example 2-14 | 0.16 | 0.28 | 140 | 193 | 50 |
| Comparative Example 2-15 | 0.14 | 0.23 | 190 | 110 | 51 |
| Comparative Example 2-16 | 0.14 | 0.23 | 190 | 145 | 88 |
| Comparative Example 2-17 | 0.14 | 0.24 | 180 | 194 | 56 |
| Comparative Example 2-18 | 0.14 | 0.24 | 180 | 181 | 52 |
| Comparative Example 2-19 | 0.14 | 0.24 | 180 | 183 | 55 |
| Comparative Example 2-20 | 0.15 | 0.25 | 190 | 172 | 53 |

The composition ratios of the metal elements of each of Examples 2-1 to 2-6 and Comparative Examples 2-5 to 2-10 were determined to satisfy the formula $Li_{1+(x/3)}Co_{1-x-y-z}Ni_{y/2}Mg_{z/2}Mn_{(2x/3)+(y/2)+(z/2)}$ (x>0; y>0; z>0; x+y+z<1) based on the idea that the part of $Ni^{2+}_{1/2}Mn^{4+}_{1/2}$ constituting $LiNi_{1/2}Mn_{1/2}O_2$ was substituted with $Mg^{2+}_{1/2}Mn^{4+}_{1/2}$ while assuming a solid solution $xLi[Li_{1/3}Mn_{2/3}]O_2$-$yLiNi_{1/2}Mn_{1/2}O_2$-$zLiMg_{1/2}Mn_{1/2}O_2$-$(1-x-y-z)LiCoO_2$ (x>0; y>0; z>0; x+y+z<1).

In Examples 2-1 to 2-6, the metal ratios were within the range defined by the present invention and the half width of the diffraction peak of (003) plane in each example was 0.14° to 0.15° and the half width of the diffraction peak of (114) plane in each example was 0.23° to 0.25°.

In Comparative Examples 2-5 to 2-7, the metal ratios were the same as that of Example 2-2. However, in these comparative examples, the calcining temperatures were 700° C., 800° C., and 900° C., respectively and thus lower than 1000° C. in Example 2-2. Therefore, the half width of the diffraction peak of (003) plane in each comparative example was 0.31°, 0.21°, and 0.17°, respectively, and larger than 0.14° in Example 2-2. Also, the half width of the diffraction peak of (114) plane in each comparative example was 0.45°, 0.31°, and 0.28°, respectively, and larger than 0.24° in Example 2-2.

Moreover, the crystalline size was 180 nm in Example 2-2, whereas, the crystallite sizes of Comparative Examples 2-5 to 2-7 were 80 nm, 110 nm, and 140 nm, respectively. As described above, it could be understood that as the calcining temperature was lower, the crystallite size became smaller.

In Comparative Examples 2-8 to 2-10, the metal ratios were the same as those of Example 2-3, Example 2-1 and Example 2-4. However, in these comparative examples, the calcining temperature was 900° C. and thus lower than 1000° C. in Example 2-3, Example 2-1 and Example 2-4. Therefore, the half width of the diffraction peak of (003) plane in each comparative example was 0.16° to 0.17°, and larger than 0.14° in Example 2-3, Example 2-1 and Example 2-4. Also, the half width of the diffraction peak of (114) plane in each comparative example was 0.28° to 0.29°, and larger than 0.23° to 0.24° in Example 2-3, Example 2-1 and Example 2-4.

Moreover, the crystalline size was 180 to 200 nm in each of Example 2-3, Example 2-1 and Example 2-4, whereas, the crystallite size of each of Comparative Examples 2-8 to 2-10 was 130 to 140 nm. In these comparative examples, the crystallite size became smaller than those in examples.

The composition ratios of the metal elements of each of Examples 2-7 to 2-10 and Comparative Example 2-11 to 2-14 were determined in the same manner as described above to satisfy the formula $Li_{1+(x/3)}Co_{1-x-y-z}Ni_{y/2}Mg_{z/2}Mn_{(2x/3)+(y/2)+(z/2)}$ (x>0; y>0; z>0; x+y+z<1) based on the idea that the part of $[Li_{1/3}Mn_{2/3}]^{3+}$ constituting $Li[Li_{1/3}$ Mn$_{2/3}$]$_{O2}$ was substituted with [Mg$_{1/2}$Mn$_{1/2}$]$^{3+}$ while assuming a solid solution xLi[Li$_{1/3}$Mn$_{2/3}$]O$_2$-yLiNi$_{1/2}$Mn$_{1/2}$O$_2$-zLiMg$_{1/2}$Mn$_{1/2}$O$_2$-(1−x−y−z)LiCoO$_2$ (x>0; y>0; z>0; x+y+z<1).

In Examples 2-7 to 2-10, the metal ratios were within the range defined by the present invention and the half width of the diffraction peak of (003) plane in each example was 0.14° to 0.15° and the half width of the diffraction peak of (114) plane in each example was 0.23° to 0.25°.

In Comparative Examples 2-11 to 2-14, the metal ratios were the same as those of Examples 2-7 to 2-10. However, in these comparative examples, the calcining temperature was 900° C. and thus lower than 1000° C. in Examples 2-7 to 2-10. Therefore, the half width of the diffraction peak of (003) plane in each example was as large as 0.16 to 0.17° and also, the half width of the diffraction peak of (114) plane in each example was as large as 0.28 to 0.29°.

Moreover, the crystalline size was 180 to 200 nm in each of Examples 2-7 to 2-10, whereas, the crystallite size of each of Comparative Examples 2-11 to 2-14 was 130 nm to 140 nm. In these comparative examples, the crystallite size became smaller than those of examples.

With respect to the active materials of Examples 2-1 to 2-10, the solid solutions satisfied the above-mentioned metal element ratios and the half width of the diffraction peak of (003) plane was 0.15° or less and also, the half width of the diffraction peak of (114) plane was 0.25° or less. These active materials could give discharge capacity exceeding 200 mAh/g and the discharge capacity of 0.1 C was improved as compared with the active materials of Comparative Examples 2-1 to 2-4 having the same composition as that of Example 2-2, except that the solid solution contained no Mg. Further, the active materials of Examples 2-1 to 2-10 had rate ratios of 58% or higher. Consequently, it was confirmed that as compared with the active materials of Comparative Examples 2-1 to 2-4, these examples had remarkably improved rate ratios and were excellent in high rate discharge characteristics.

On the other hand, with respect to the active materials of Comparative Examples 2-5 to 2-14, the solid solutions satisfied above-mentioned the metal element ratios; however, in the case where the half width of the diffraction peak of (003) plane exceeded 0.15° and the half width of the diffraction peak of (114) plane exceeded 0.25°, discharge capacity lower than 200 mAh/g was obtained. The rate ratio was also 54% or less. As compared with the active materials of Comparative Examples 2-1 to 2-4, which were the same as the active material of Example 2-2 except that the solid solutions contained no Mg, the active materials of Comparative Examples 2-5 to 2-14 were not improved in both of the discharge capacity of 0.1 C and the rate ratio (high rate discharge characteristics).

Further, the active material of Comparative Example 2-1 had a half width of the diffraction peak of (003) plane of 0.15° or less and a half width of the diffraction peak of (114) plane of 0.25° or less, that is, within the range of the present invention. In Comparative Example 2-1, the discharge capacity of 0.1 C was improved as compared with the active materials of Comparative Examples 2-2 to 2-4 having half widths out of the range of the present invention. However, the improvement of rate ratio was not confirmed in Comparative Example 2-1. Consequently, it cannot be said that in the case where the solid solution contains no Mg, the high rate discharge characteristics can be improved merely by making the half widths of the diffraction peak of (003) plane and the diffraction peak of (114) plane small.

Comparative Example 2-15 was a comparative example (concretely, the case of x=0, y=0.56, and z=0.10) corresponding to the case where a part of the transition metal site of an active material LiCo$_{1/3}$Ni$_{1/3}$Mn$_{1/3}$O$_2$ wherein x=0, y=2/3, and z=0 was substituted with Mg under the condition of Li$^{1+}$, Mn$^{4+}$, Ni$^{2+}$, Co$^{3+}$, and Mg$^{2+}$. The calcining temperature was 1000° C., which was the same as that of example, and the half widths of the diffraction peak of (003) plane and the diffraction peak of (114) plane were also the same. In this comparative example, the valence condition was satisfied, and as described in Non-Patent Document 6, as compared with Comparative Example 2-16, which was the active material containing no Mg, although the calcining temperature and the half widths of the diffraction peak of (003) plane and the diffraction peak of (114) plane were the same, a decrease of the discharge capacity was observed.

With respect to the active materials of Examples 2-1 to 2-10, the half width of the diffraction peak of (003) plane in each example was 0.15° or less and also, the half width of the diffraction peak of (114) plane in each example was 0.25° or less. Accordingly, since the crystallite size also became 180 nm or larger, the high rate discharge characteristics were improved.

On the other hand, the active materials of Comparative Examples 2-2 to 2-14 had large half width, and accordingly the crystallite size became as small as 140 nm or lower and therefore, the high rate discharge characteristics were not improved.

Further, the active material of Comparative Example 2-1 had a half width as small as those of Examples 2-1 to 2-10. Therefore, the crystallite size was 180 nm or larger. However, since the solid solution contained no Mg, the high rate discharge characteristics were not improved.

The active material of Comparative Example 2-15 contained Mg and the crystallite size was 180 nm or larger. However, since Comparative Example 2-15 contained no Li$^+$ in the transition metal site. Therefore, both of the discharge capacity of 0.1 C and the rate ratio (high rate discharge characteristics) were not improved.

The active material of Comparative Example 2-16 had a crystallite size of 180 nm or larger and was excellent in high rate discharge characteristics. However, the active material of Comparative Example 2-16 contained no Li$^+$ in the transition metal site. Therefore, the discharge capacity of 0.1 C was not improved.

Consequently, in order to keep the high discharge capacity and to improve the high rate discharge capability, it is preferable that the solid solution is made to satisfy the above-mentioned metal element ratios and at the same time the crystallite size is adjusted to 180 nm or larger.

In the case of the active materials of Comparative Examples 2-17 to 2-20 containing Al or Ti in place of Mg and calcined at 1000° C., the solid solutions of the lithium-transition metal composite oxides had X-ray diffraction patterns capable of belonging to space group P3$_1$12 and the half width of the diffraction peak of (003) plane was 0.15° or less and the half width of the diffraction peak of (114) plane was 0.25° or less in the X-ray diffractometry pattern. However in these comparative examples, no discharge capacity exceeding 200 mAh/g was obtained and also the high rate discharge characteristics were inferior.

As described above, it can be said that the active material of the present invention satisfies three requirements: "the composition ratios of the metal elements contained in the solid solution of the lithium-transition metal composite oxide satisfy Li$_{1+(x/3)}$Co$_{1-x-y-z}$Ni$_{y/2}$Mg$_{z/2}$Mn$_{(2x/3)+(y/2)+(z/2)}$ (x>0; y>0; z>0; x+y+z<1)"; "the solid solution has an X-ray diffraction pattern capable of belonging to space group P3$_1$12"; and "the half width of the diffraction peak of (003) plane was 0.15° or less and the half width of the diffraction peak of (114) plane was 0.25° or less in the X-ray diffractometry diagram", so that high discharge capacity exceeding 200 mAh/g can be obtained and excellent high rate discharge characteristics can be provided.

Example 3

Example 3-1

An active material having the composition $Li_{1.2}Co_{0.1}Ni_{0.139}Mg_{0.011}Mn_{0.55}O_2$ (the same active material as that of Example 2-1 in Example 2) was synthesized in the same manner as in Example 1-1.

Comparative Example 3-1

The active material of Comparative Example 3-1 (the same active material as that of Comparative Example 2-1 in Example 2) was synthesized in the same manner as in Example 3-1, except that Mg was removed from the metal elements contained in the coprecipitated hydroxide precursor.

Comparative Example 3-2

The active material of $LiCu_{0.33}Ni_{0.32}Mg_{0.013}Mn_{0.33}O_2$ was synthesized in the same manner as in Example 3-1, except that the composition of the transition metal elements contained in the coprecipitated hydroxide precursor and the amount of lithium hydroxide monohydrate to be mixed were changed according to the composition formula shown in Comparative Example 3-2 in Table 3.

Comparative Example 3-3

The active material of Comparative Example 3-3 (the same active material as that of Comparative Example 2-16 in Example 2) was synthesized in the same manner as in Comparative Example 3-2, except that Mg was removed from the metal elements contained in the coprecipitated hydroxide precursor.

The half width of the diffraction peak of (003) plane and the half width of the diffraction peak of (114) plane were measured in the same manner as in Example 2 and the crystallite size was calculated.

The active material of Comparative Example 3-2 was $Li[Li_{1/3}Mn_{2/3}]O_2(x)$: 0.000, $LiNi_{1/2}Mn_{1/2}O_2(y)$: 0.641, $LiMg_{1/2}Mn_{1/2}O_2(z)$: 0.026 and $LiCoO_2(1-x-y-z)$: 0.333. The half width of the diffraction peak of (003) plane was 0.14° and the half width of the diffraction peak of (114) plane was 0.23° and the crystallite size was 190 nm in Comparative Example 3-3.

(Production and Evaluation of Lithium Secondary Battery)

Using the respective active materials of Example 3-1 and Comparative Examples 3-1 to 3-3 as a positive active material for a lithium secondary battery, lithium secondary batteries were produced in the same procedure as in Example 1 and the battery characteristics were evaluated.

(DSC Measurement Method)

Lithium secondary batteries produced in the same procedure as in Example 1 and treated by initial charge-discharge step were subjected to constant current constant voltage charge at an electric current of 0.1 ItmA and a voltage of 4.3 V for 15 hours.

Next, each battery was disassembled in an argon box at a dew point of −40° C. or lower and the positive electrode was taken out and the positive electrode plate was punched by a 3 mmϕ punch. Thereafter, an Al foil current collecter and a composite layer were sealed together in a stainless steel pan for DSC (differential scanning calorimetry) measurement and DSC measurement was carried out. In DSC measurement, $Al_2O_3$ was used as a reference and the measurement was performed in a temperature range from room temperature to 400° C. in an argon atmosphere. The temperature increasing rate was adjusted to 5° C./min.

A method of sealing each sample and a method of reading the heat generation peak were conducted according to JIS K 7121-1987 (Testing methods for transition temperatures of plastics).

Table 3 shows the results of the charge-discharge cycle test (0.1 C capacity), the rate ratios, and the DSC heat generation peak temperatures.

TABLE 3

| | Composition | Discharge capacity mAh/g | Rate ratio % | DSC heat generation peak temperature/° C. |
|---|---|---|---|---|
| Example 3-1 | $Li_{1.2}Co_{0.1}Ni_{0.139}Mg_{0.011}Mn_{0.55}O_2$ | 242 | 71 | 297 |
| Comparative Example 3-1 | $Li_{1.2}Co_{0.1}Ni_{0.15}Mn_{0.55}O_2$ | 223 | 52 | 277 |
| Comparative Example 3-2 | $LiCo_{0.33}Ni_{0.32}Mg_{0.013}Mn_{0.33}O_2$ | 120 | 63 | 314 |
| Comparative Example 3-3 | $LiCo_{0.33}Ni_{0.33}Mn_{0.33}O_2$ | 145 | 88 | 314 |

As shown in Table 3, in the case of the active material of Comparative Example 3-2, in which Mg was used for the lithium-nickel-manganese-cobalt composite oxide without lithium-rich (Comparative Example 3-3), the discharge capacity was worsened and at the same time, the heat stability was not changed. On the other hand, in the case of the active material of Example 3-1, in which Mg was used for the lithium-rich lithium-nickel-manganese-cobalt composite oxide (Comparative Example 3-1), the discharge capacity was improved and at the same time, the heat stability was also improved.

INDUSTRIAL APPLICABILITY

The active material for a lithium secondary battery of the present invention has high discharge capacity and is excellent in high rate discharge characteristics, so that it is advantageously utilized for a lithium secondary battery of an electric power source for an electric vehicle, an electric power source for an electronic appliance, an electric power source for electric power storage, and the like.

The invention claimed is:

1. An active material for a lithium secondary battery comprising a solid solution of a lithium-transition metal composite oxide having an α-NaFeO₂ type crystal structure, wherein the composition ratios of metal elements contained in the solid solution satisfy $Li_{1+(x/3)}Co_{1-x-y-z}Ni_{y/2}Mg_{z/2}Mn_{(2x/3)+(y/2)+(z/2)}$ (x>0; y>0; z>0; x+y+z<1);

the active material has an x-ray diffraction pattern capable of belonging to space group $P3_112$ or $R\bar{3}m$; and a peak intensity ratio between the diffraction peak intensity $I_{(003)}$ of (003) plane and the diffraction peak intensity $I_{(114)}$ of (114) plane or the diffraction peak intensity $I_{(104)}$ of (104) plane measured by x-ray diffractometry is $I_{(003)}/I_{(114)} \geq 1.15$ or $I_{(003)}/I_{(104)} \geq 1.15$.

2. The active material for a lithium secondary battery according to claim 1, wherein the composition ratios of the metal elements contained in the solid solution of a lithium-transition metal composite oxide are $1/3 < x < 2/3$; $0 < y < 2/3$; and $0 < z < 0.3$.

3. The active material for a lithium secondary battery according to claim 1, wherein the valences of the respective elements constituting the solid solution of a lithium-transition metal composite oxide are $Li^{1+}$, $Mn^{4+}$, $Ni^{2+}$, $Co^{3+}$, and $Mg^{2+}$.

4. The active material for a lithium secondary battery according to claim 1, wherein the lithium-transition metal composite oxide has a crystallite size of 150 nm or larger.

5. The active material for a lithium secondary battery according to claim 1, which has discharge capacity exceeding 200 mAh/g.

6. A method for producing the active material for a lithium secondary battery according to claim 1, wherein the solid solution of a lithium-transition metal composite oxide is produced through the step of calcining at a calcining temperature of 920 to 1000° C.

7. A method for producing the active material for a lithium secondary battery according to claim 1, comprising the step of producing the solid solution of a lithium-transition metal composite oxide by a coprecipitation method.

8. An electrode for a lithium secondary battery comprising the active material for a lithium secondary battery according to claim 1.

9. A lithium secondary battery comprising the electrode for a lithium secondary battery according to claim 8.

10. A method for producing the lithium secondary battery according to claim 9 employing a charging method where the positive electrode upon charge has a maximum reaching potential of 4.3 V (vs. Li/Li$^+$) or lower, the method comprising the step of:

charging the lithium secondary battery in such a manner that the potential of the electrode for a lithium secondary battery reaches at least a region appearing in a positive electrode potential range exceeding 4.3 V (vs. Li/Li$^+$) and 4.8 V (vs. Li/Li$^+$) or less and having a relatively plateau potential variation.

11. An active material for a lithium secondary battery comprising a solid solution of a lithium-transition metal composite oxide having an α-NaFeO$_2$ type crystal structure, wherein the composition ratios of metal elements contained in the solid solution satisfy $Li_{1+(x/3)}Co_{1-x-y-z}Ni_{y/2}Mg_{z/2}Mn_{(2x/3)+(y/2)+(z/2)}$ ($x>0$; $y>0$; $z>0$; $x+y+z<1$);

the active material has an x-ray diffraction pattern capable of belonging to space group $P3_112$ or $R\bar{3}m$; and the half-width of the diffraction peak of (003) plane measured by x-ray diffractometry is 0.15° or less and the half-width of the diffraction peak of (114) plane or the diffraction peak of (104) plane measured by x-ray diffractometry is 0.25° or less.

12. The active material for a lithium secondary battery according to claim 11, wherein the composition ratios of the metal elements contained in the solid solution of a lithium-transition metal composite oxide are $1/3 < x < 2/3$; $0 < y < 2/3$; and $0 < z < 0.3$.

13. The active material for a lithium secondary battery according to claim 11, wherein the valences of the respective elements constituting the solid solution of a lithium-transition metal composite oxide are $Li^{1+}$, $Mn^{4+}$, $Ni^{2+}$, $Co^{3+}$, and $Mg^{2+}$.

14. The active material for a lithium secondary battery according to claim 11, wherein the lithium-transition metal composite oxide has a crystallite size of 150 nm or larger.

15. The active material for a lithium secondary battery according to claim 11, which has discharge capacity exceeding 200 mAh/g.

16. A method for producing the active material for a lithium secondary battery according to claim 11, wherein the solid solution of a lithium-transition metal composite oxide is produced through the step of calcining at a calcining temperature of 920 to 1000° C.

17. A method for producing the active material for a lithium secondary battery according to claim 11, comprising the step of producing the solid solution of a lithium-transition metal composite oxide by a coprecipitation method.

18. An electrode for a lithium secondary battery comprising the active material for a lithium secondary battery according to claim 11.

19. A lithium secondary battery comprising the electrode for a lithium secondary battery according to claim 18.

20. A method for producing the lithium secondary battery according to claim 19 employing a charging method where the positive electrode upon charge has a maximum reaching potential of 4.3 V (vs. Li/Li$^+$) or lower, the method comprising the step of:

charging the lithium secondary battery in such a manner that the potential of the electrode for a lithium secondary battery reaches at least a region appearing in a positive electrode potential range exceeding 4.3 V (vs. Li/Li$^+$) and 4.8 V (vs. Li/Li$^+$) or less and having a relatively plateau potential variation.

\* \* \* \* \*